(12) United States Patent

Thouin

(10) Patent No.: US 12,668,166 B2

(45) Date of Patent: Jun. 30, 2026

(54) TRAILER WITH MODULAR CLIMATE CONDITIONED ZONES

(71) Applicant: REMORQUES CFT INC., Sainte-Anne-des-Plaines (CA)

(72) Inventor: Francois Thouin, Sainte-Anne-des-Plaines (CA)

(73) Assignee: REMORQUES CFT INC., Sainte-Anne-des-Plaines (CA)

( * ) Notice: Subject to any disclaimer, the term of this patent is extended or adjusted under 35 U.S.C. 154(b) by 65 days.

(21) Appl. No.: 19/229,873

(22) Filed: Jun. 5, 2025

(65) Prior Publication Data

US 2025/0376102 A1 Dec. 11, 2025

Related U.S. Application Data

(60) Provisional application No. 63/656,993, filed on Jun. 6, 2024.

(51) Int. Cl.
| | |
|---|---|
| B60P 3/20 | (2006.01) |
| B62D 33/04 | (2006.01) |
| B62D 63/08 | (2006.01) |

(52) U.S. Cl.
CPC ............ B60P 3/205 (2013.01); B62D 33/048 (2013.01); *B62D 63/08* (2013.01)

(58) Field of Classification Search
CPC ..... B62D 25/2054; B62D 33/048; B60P 3/20; B60P 3/205
USPC ........................ 296/24.35, 24.4, 24.41, 181.6
See application file for complete search history.

(56) References Cited

U.S. PATENT DOCUMENTS

| | | | | |
|---|---|---|---|---|
| 3,089,313 | A | * | 5/1963 | Fix .......................... F25D 13/02 296/181.6 |
| 4,087,125 | A | * | 5/1978 | Stephens ................. B60P 3/205 296/24.35 |
| 4,553,584 | A | | 11/1985 | Bloomquist |
| 4,887,437 | A | | 12/1989 | Fenton |
| 4,899,554 | A | | 2/1990 | Kato |
| 4,943,204 | A | | 7/1990 | Ehrlich |
| 4,997,335 | A | | 3/1991 | Prince |
| 5,054,295 | A | * | 10/1991 | Goulooze ............ B60H 1/3232 410/127 |

(Continued)

FOREIGN PATENT DOCUMENTS

| | | |
|---|---|---|
| CA | 2801981 | 12/2011 |
| CN | 210941997 | 7/2020 |

(Continued)

OTHER PUBLICATIONS

Translation of RU 2383453 (Year: 2008).*

*Primary Examiner* — Gregory A Blankenship

(74) *Attorney, Agent, or Firm* — Decode Legal Inc.; Mathieu Audet

(57) ABSTRACT

A refrigeration body to be mounted to a chassis to obtain a climatized vehicle. The refrigeration body has an enclosure delimited by external surfaces; internal and walls dividing the enclosure into a plurality of sub-cargo volumes accessible through dedicated doors. The refrigeration body has a plurality of conditioning units mounted to at least one of the external surface, with at a first one of the plurality of conditioning units that is fluidly coupled to a first one of the sub-cargo volumes, and a second one of the plurality of conditioning units that is fluidly coupled to a second one of the sub-cargo volumes.

20 Claims, 32 Drawing Sheets

(56)         References Cited

U.S. PATENT DOCUMENTS

| | | | |
|---|---|---|---|
| 5,092,721 A | 3/1992 | Prince | |
| 6,606,875 B1 * | 8/2003 | Grand | F25D 11/003 |
| | | | 62/239 |
| 7,114,905 B2 * | 10/2006 | Dibdin | B60P 1/02 |
| | | | 414/679 |
| 7,524,157 B2 | 4/2009 | Hurler | |
| 7,665,788 B2 | 2/2010 | Dibdin | |
| 7,871,229 B2 * | 1/2011 | Haddad | B65D 90/0066 |
| | | | 410/140 |
| 8,523,508 B2 | 9/2013 | Hurler | |
| 9,199,568 B2 | 12/2015 | Dibdin | |
| 11,098,943 B2 | 8/2021 | Senf | |
| 11,186,214 B2 * | 11/2021 | Das | B62D 33/042 |
| 11,654,814 B2 | 5/2023 | Bell | |
| 2004/0016493 A1 | 1/2004 | Sandstrom | |
| 2006/0092003 A1 | 5/2006 | Gardner | |
| 2007/0274799 A1 * | 11/2007 | Dibdin | B60P 1/02 |
| | | | 410/30 |
| 2010/0119323 A1 * | 5/2010 | Nelson | B61D 45/006 |
| | | | 410/130 |
| 2011/0148134 A1 * | 6/2011 | Gerhardt | B60P 7/14 |
| | | | 296/24.4 |
| 2016/0101674 A1 | 4/2016 | Riv | |
| 2017/0210194 A1 * | 7/2017 | Ling | H01M 10/0525 |
| 2018/0368352 A1 * | 12/2018 | Smith | A01K 1/0035 |
| 2019/0264973 A1 | 8/2019 | Koelsch | |
| 2019/0300075 A1 * | 10/2019 | Wiberg | B62D 29/008 |
| 2021/0070140 A1 * | 3/2021 | Srnec | B60H 1/00764 |
| 2021/0101745 A1 * | 4/2021 | Cruz | B65G 1/0485 |
| 2021/0362567 A1 | 11/2021 | Koelsch | |
| 2022/0089226 A1 * | 3/2022 | Henning | B62D 33/04 |
| 2022/0153312 A1 * | 5/2022 | Pickett | B60P 3/20 |
| 2022/0228790 A1 * | 7/2022 | Hibbert-Garibaldi | |
| | | | F25D 17/04 |
| 2023/0341168 A1 | 10/2023 | Subrahmanya | |
| 2024/0025229 A1 * | 1/2024 | Donnellan | B60H 1/3232 |
| 2024/0255208 A1 * | 8/2024 | Sugimoto | B62D 33/042 |
| 2024/0317327 A1 * | 9/2024 | Borgerding | B60P 3/205 |
| 2025/0075961 A1 * | 3/2025 | Ji | F25D 17/04 |

FOREIGN PATENT DOCUMENTS

| | | | |
|---|---|---|---|
| EP | 0624491 | | 11/1994 |
| EP | 0763459 | | 3/1997 |
| EP | 3153349 | | 4/2017 |
| EP | 3974251 | | 11/2023 |
| RU | 2383453 C1 * | | 3/2010 |
| WO | 162542 | | 8/2001 |
| WO | 2011154410 | | 12/2011 |

* cited by examiner

Front ⟷ Rear

TRAILER WITH MODULAR CLIMATE CONDITIONED ZONES

CROSS-REFERENCE TO RELATED APPLICATION

This application claims priority to, or benefit of, provisional application U.S. 63/656,993, filed Jun. 6, 2024, entitled TRAILER WITH MODULAR CLIMATE CONDITIONED ZONES, the specification of which is hereby incorporated herein by reference in its entirety.

BACKGROUND

(a) Field

The subject matter disclosed generally relates to vehicles, and particularly to delivery vehicles for perishable merchandises. More particularly, the subject matter disclosed relates to climatized delivery vehicles to alleviate external temperature difference with the merchandises required conservation temperature.

The subject matter disclosed further generally relates to means and methods to more efficiently load and unload such vehicles from merchandises.

(b) Related Prior Art

In the field of delivery trucks, and more particularly cargo volume of refrigerated and heated delivery trucks, delivery trucks are used to deliver a variety of merchandises, to one or many locations. The merchandises carried in the cargo volume may be subject to different temperature conditions required for best storage departing from external environmental temperature, and deliver the merchandise in one locations should not affect the merchandises remaining in the truck for a subsequent location.

Prior art delivery vehicles generally have a cargo volume adapted to maintain a single temperature setting. The merchandises carried therein could require different conservation temperature requirements; the single temperature setting being not optimal for all merchandises.

Delivery vehicles with a single cargo volume are prone to integral temperature variations when the cargo volume is opened to access the merchandises therein, hence being energetical inefficient in addition to increased temperature variations that could be detrimental to the merchandises contained therein. Delivery vehicles with a single cargo volume also fail to optimize usage therein given the variety of merchandises contained therein. Optimal vertical practical usage of cargo volume remains a challenge thus failing to optimally fill the cargo volume with merchandises. Large cargo volumes are also challenging for optimally maintain a constant temperature over its vertical volume, the higher the warmer, which could be detrimental to secure required temperature for optimal merchandises conservation.

Further, managements of delivery merchandises of delivery vehicles with a single cargo volume requires structure management of order in which they are loaded, since first loaded merchandise becomes afterwards hard to access if not inaccessible until merchandises loaded afterwards is unloaded, increasing loading/unloading challenges.

Besides, other large cargo volume for delivery vehicles that are equipped with lateral doors are challenged in receiving merchandises therein given the lateral access doors preventing standard rearward loading from a dock with a forklift and pallets.

Additionally, a proportion of the delivery vehicles have unleveled floors featuring floor portion(s) lower than the upper level of the rear wheels presenting an additional encumbrance for easy merchandises loading, particularly from the rear, and cargo volume optimization.

Accordingly, problems to contemplate in the field of delivery vehicles includes to provide a solution to improve the thermal management of the cargo volume, to improve structure of the cargo volume to improve the loading and unloading process of merchandises within, to provide improvement without affecting negatively the temporary storing of the merchandises during the transportation, and to provide improvement in the loading and storing of the merchandises in the delivery truck to optimize the storing of merchandises therein.

In other words, within the field of transportation, there is a need for energy management optimization, which is obtains inter alia, through minimization of thermal loss, minimization of weight, control of unused space, and controlled access to merchandises.

Another need is for delivery trucks adapted to carrying merchandises requiring different optimal conservation temperatures and conditions.

There is a need for delivery trucks allowing an improved merchandises loading and unloading process therefrom.

There is also a need for a traceable system for goods transported between an original location to a desired destination.

There is therefore a need for improvement in this field involving at least one of the mentioned characteristics.

SUMMARY

According to embodiments of the invention, there is provided a climatized body with a plurality of modulated climate conditioned zones. When mounted to a non-motorized chassis, the chassis and body combination defining the cargo volume is a trailer type of vehicle. Conversely, the cargo volume can alternatively be assembled to a motorized-chassis in a straight body configuration.

According to embodiments of the invention, there is provided a cargo volume including a plurality of sub-cargo volumes adapted to be individually managed for providing different temperature for simultaneously receiving therein merchandises requiring distinct conservation temperature. The sub-cargo volumes are also designed in a manner to maximize usable volume. Sub-cargo volumes are separated with movable sub-cargo volumes configured to allow rearward loading of merchandises while in an opened position and ensuring proper temperature insulation when in a closed position.

According to embodiments of the invention, there is provided a plurality of vertically movable floor portions located in front and/or at the rear of the rear wheels of the vehicle to allow rear access to the entire cargo volume when the vertically movable floor portions are in their upper position and allowing increased usage of the cargo volume when in their lower position.

In some aspects, the description herein relates to a cargo container of a hauled or motorized vehicle, the vehicle including at least one axle, the vehicle having a driver side and a curb side, the cargo container including: a front wall and a rear wall with a longitudinal axis extending towards one another, two side walls with a transversal axis extending towards one another, the front wall, the rear wall and the side walls enclosing a cargo volume, wherein the cargo container is adapted to store a plurality of cargos therein; at least one partition panel spanning transversally, the at least one partition panel being moveable between an opened position and a closed position, the partition panel, when in the closed position, partitioning cargo volume into a plurality of rooms; and a plurality of exterior doors accessible from outside the cargo container, including at least one rear door providing an access to all of the rooms of the cargo volume when the at least one partition panel is in the opened position, and a plurality of side doors located on a side in the respective side wall, the plurality of side doors providing an access to the rooms when the partition panel is in the opened position and when the partition panel is in the closed position.

In some aspects, the description herein relates to a cargo container, wherein each of the at least one partition panel includes a fixed partition frame and a partition door rotatably mounted to the partition frame.

In some aspects, the description herein relates to a cargo container, further including a seal sealing rooms from one another when the partition door is in the closed position.

In some aspects, the description herein relates to a cargo container, wherein the partition door extends from the partition frame towards the rear wall when in the opening position.

In some aspects, the description herein relates to a cargo container, further including a longitudinal wall extending parallel to the longitudinal axis, the longitudinal wall dividing the cargo volume into a driver side volume and a curb side volume, and wherein the at least one partition panel span between a side wall and the longitudinal wall.

In some aspects, the description herein relates to a cargo container, wherein the partition door is extending aside the longitudinal wall when in the opened position.

In some aspects, the description herein relates to a cargo container, wherein the at least one partition panel includes at least one driver side partition panel and at least one curb side partition panel, the cargo container including a conditioning unit coupled operatively to a first one of the rooms on the driver side of the longitudinal wall and a second one of the rooms on the curb side of the longitudinal wall.

In some aspects, the description herein relates to a cargo container, further including a conditioning unit coupled operatively to a first one of the rooms, whereby the conditioning unit is conditioning one of the at least one room independently one another.

In some aspects, the description herein relates to a cargo container, further including a roof, wherein the conditioning unit is mounted to the roof.

In some aspects, the description herein relates to a cargo container, further including a wheelhouse and a floor divided in a plurality of floor portions, wherein a first one of the floor portions located above the wheelhouse has a first height, and a second one of the floor portions located distant to the wheelhouse has a second height different from the first height, whereby the floor including the plurality of floor portion unleveled relative to one another.

In some aspects, the description herein relates to a cargo container, wherein the rear door extends from the first height upwards, and at least one of the side doors extends upwards from a third height lower than the first height.

In some aspects, the description herein relates to a cargo container, further including a first raising floor system including a top surface that is controllably movable between a low position and a high position levelled with the first floor portion.

In some aspects, the description herein relates to a cargo container, including a second raising floor system, wherein the first raising floor system and the second raising floor system are located on opposite sides of the longitudinal wall.

In some aspects, the description herein relates to a cargo container, wherein the first raising floor system includes a scissor-based mechanism movable between a collapsed position and an extended position.

In some aspects, the description herein relates to a cargo container, including a second raising floor system, wherein the first raising floor system and the second raising floor system are controllable independently from one another, wherein the first raising floor system and the second raising floor system are neighbor longitudinally to one another, wherein length of a continuous leveled floor is controllable by independently controlling position of the first raising floor system and of the second raising floor system.

In some aspects, the description herein relates to a cargo container, further including an external floor extending rearwards to the rear wall, with the external floor and the first floor portion being leveled relative to one another.

In some aspects, the description herein relates to a cargo container, wherein, on the second floor portion the at least one partition panel includes a fixed partition frame extending upwards from the second floor portion, and a partition door rotatably mounted to the partition frame, the partition door extending upwards from the first height.

In some aspects, the description herein relates to a cargo container, including chassis including a longitudinal central beam assembly, and a body including a groove, wherein the body in mounted to the chassis with the longitudinal central beam assembly inserted in the groove.

In some aspects, the description herein relates to a cargo container, wherein the chassis includes a transversal beams extending from the central beam assembly, wherein the side walls are at least partially supported by the transversal beams.

In some aspects, the description herein relates to a cargo container, wherein the chassis includes a front section, a wheelhouse section and a rear section, with height of bottom of the chassis is varying along the sections.

In some aspects, the description herein relates to a cargo container, wherein the plurality of rooms includes at least eight (8) rooms.

In some aspects, the description herein relates to a shelving system for rooms of a cargo container. The shelving system comprises telescopic frames that are rotatable between a horizontal position and a vertical position. In the horizontal position, shelves are laid between the telescopic frames, providing a uniform surface to place goods thereon, and in the vertical position, the shelves can be mounted to the telescopic frames, providing a plurality of shelves and a base to place goods thereon.

In some aspects, the description herein relates to an Artificial Intelligence (AI) system comprising an AI instance adapted to optimize at least one of a loading process, an unloading process, and an energy management of conditioning units of a delivery vehicle comprising a plurality of rooms that can be maintained at different temperatures.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

The realizations will now be described more fully hereinafter with reference to the accompanying figures, in which realizations are illustrated. The foregoing may, however, be embodied in many different forms and should not be construed as limited to the illustrated realizations set forth herein.

With respect to the present description, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values and of values herein or on the drawings are not intended to be limiting, referring instead individually to any and all values falling within the range, unless otherwise indicated herein, and each separate value within such a range is incorporated into the specification as if it were individually recited herein. The words "about", "approximately", or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described realizations. The use of any and all examples, or exemplary language ("e.g.," "such as", or the like) provided herein, is intended merely to better illuminate the exemplary realizations and does not pose a limitation on the scope of the realizations. No language in the specification should be construed as indicating any unclaimed element as essential to the practice of the realizations. The use of the term "substantially" is intended to mean "for the most part" or "essentially" depending on the context. It is to be construed as indicating that some deviation from the word it qualifies is acceptable as would be appreciated by one of ordinary skill in the art to operate satisfactorily for the intended purpose.

In the following description, it is understood that terms such as "first", "second", "top", "bottom", "above", "below", and the like, are words of convenience and are not to be construed as limiting terms.

Figure 1:
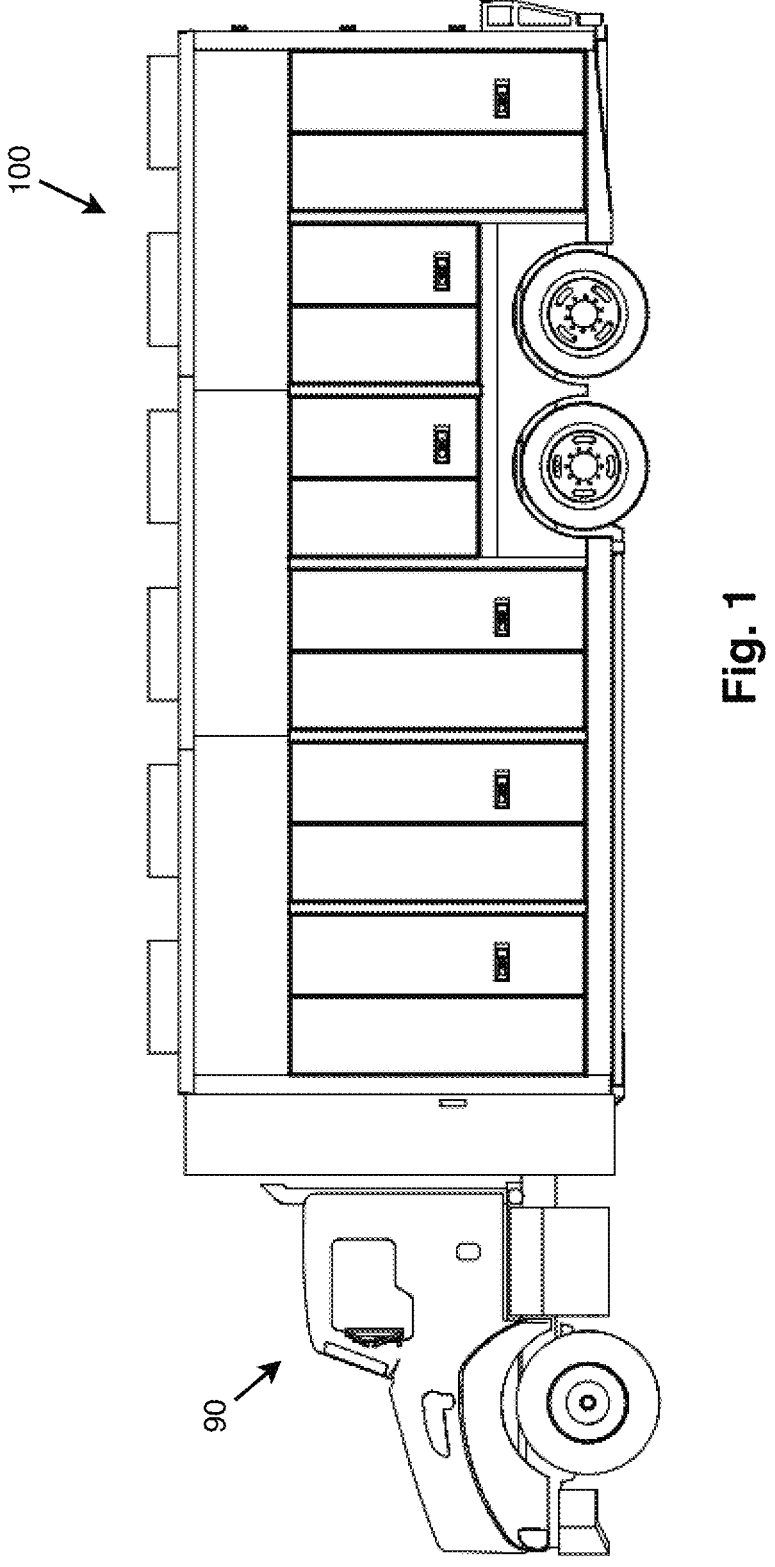
FIG. 1 is a side view of a delivery vehicle comprising a cargo container in accordance with an embodiment.

The terms "top", "up", "upper", "bottom", "lower", "down", "vertical", "horizontal", "interior", "exterior" "driver side" and "curb side" and the like are intended to be construed in their normal meaning in relation with normal installation of the product, with normal orientation of the components being provided through, inter alia, FIG. 1.

In should further be noted that the terms "driver side" and "curb side" are used to identify a discussed a feature depicted on a side on a figure. The feature discussed is identified with the reference thereof, but should not be construed to be limited to the side thereof, unless stated specifically otherwise.

It should further be noted that for purposes of this disclosure, the term "coupled" means the joining of two members directly or indirectly to one another. Such joining may be stationary in nature or movable in nature. Such joining, in case additional function, may be adapted for fluids, electricity, electrical signals, or other types of signals or communication to flow between two members. Such joining may be achieved with the two members or the two members and any additional intermediate members being integrally formed as a single unitary body with one another, or with the two members or the two members and any additional intermediate members being attached to one another. Such joining may be permanent in nature or alternatively may be removable or releasable in nature.

In realizations, there are disclosed a cargo container 100 to be mounted to a motorized chassis for obtaining a climatized cargo volume truck, or alternatively to be mounted on a chassis of a semitrailer to obtain a climatized cargo volume semitrailer.

It is to be understood that the present description contemplates therethrough a variety of realizations, wherein the cargo container 100 may take part in a vehicle.

Referring to FIG. 1, an auto-propelled delivery vehicle comprises a combination of a vehicle chassis 90 and a cargo container 100 mounted to the vehicle chassis 90. The transport vehicle comprises at least one axle supporting at least part of the weight of the cargo container 100.

According to embodiments, the cargo container 100 is adapted to be mounted to a vehicle chassis, or alternative to a chassis designed to be hauled by a tractor and thus defining a trailer, or (not shown) comprising its own chassis and axle(s) forming thereby being a trailer.

Figure 2:
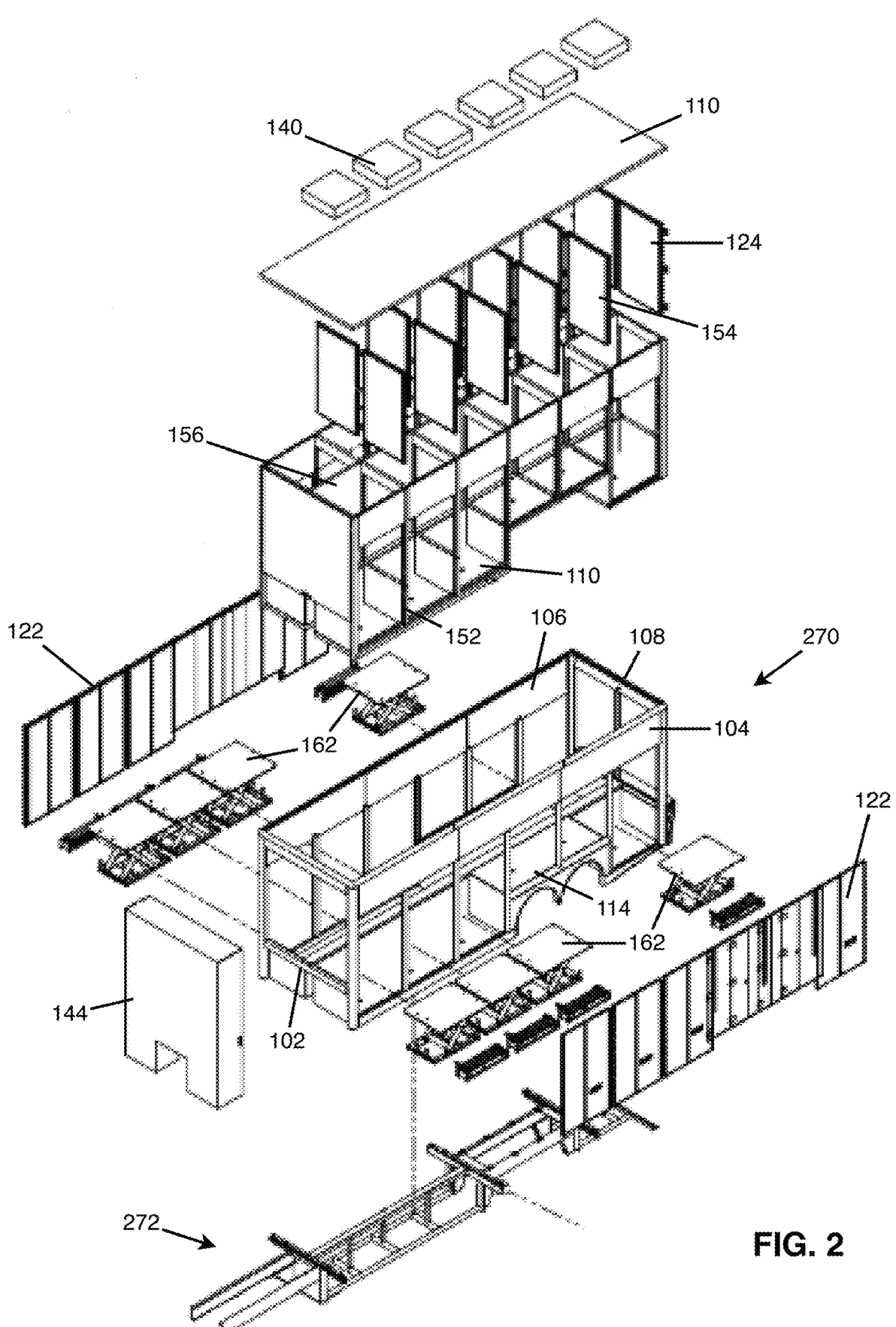
FIG. 2 is an exploded perspective view of a cargo container comprising an exploded body and a chassis in accordance with an embodiment.

Referring to FIG. 2, the structure of the cargo container 100 comprises a body 270 and a chassis 272. The body 270 comprises front wall 102, side walls 104, 106, rear wall 108, wheelhouses 114, and roof 112. To complete the body 270, interior finishing components are added, comprising a floor 110, a longitudinal wall 156, transversal partition panels 152 and interior partition doors 154. The body 270 further comprises rear doors 124 and side doors 122. The body 270 of the described embodiment further comprises an external room 144. In addition, for functionality, the cargo container 100 comprises conditioning units 140 and raising floor systems 162.

Figure 3:
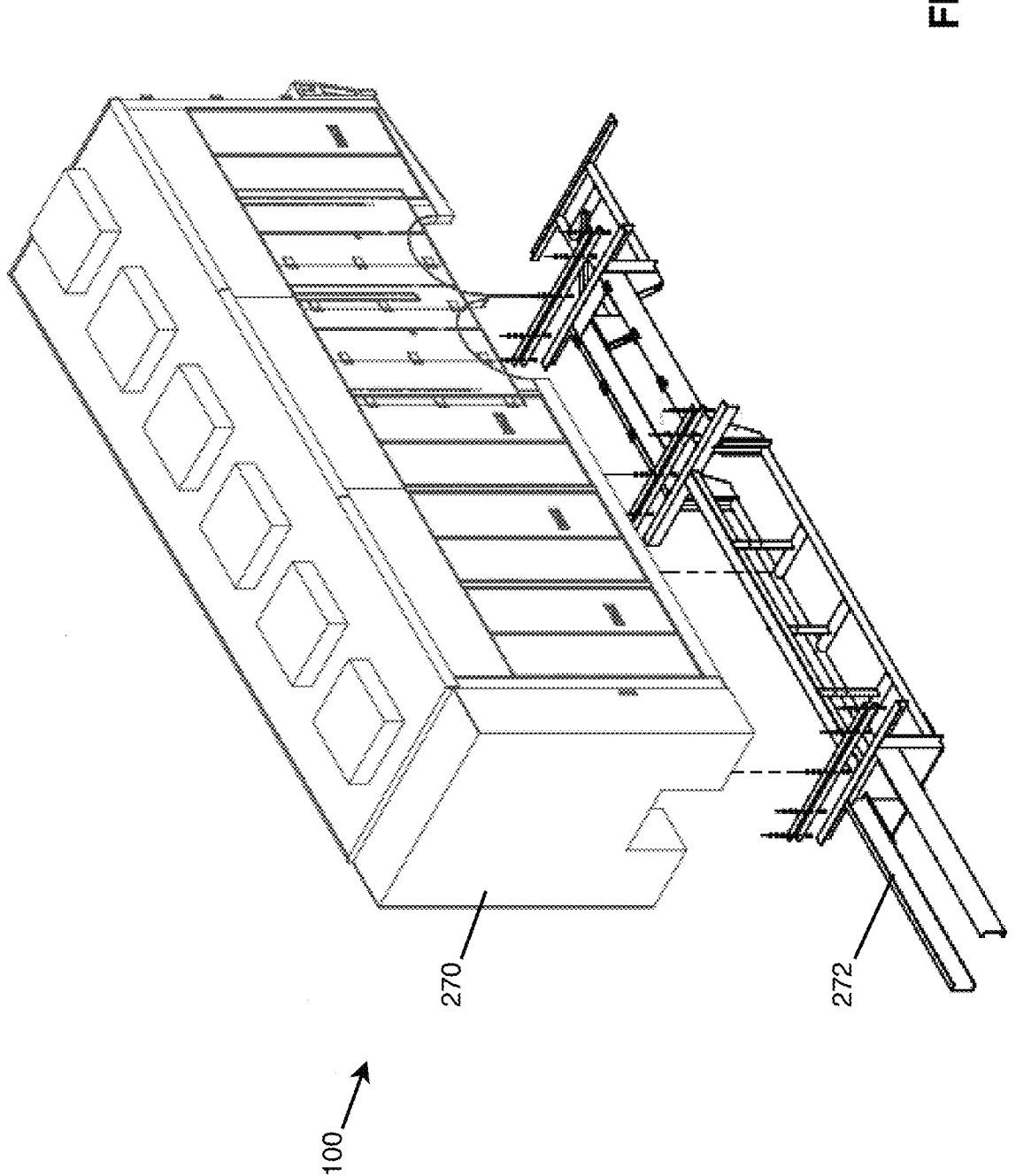
FIG. 3 is an exploded perspective view of a cargo container depicting an assembled body and a chassis in accordance with an embodiment.

Referring additionally to FIG. 3, the body 270 is designed to be installed and secured to the chassis 272.

Figure 4:
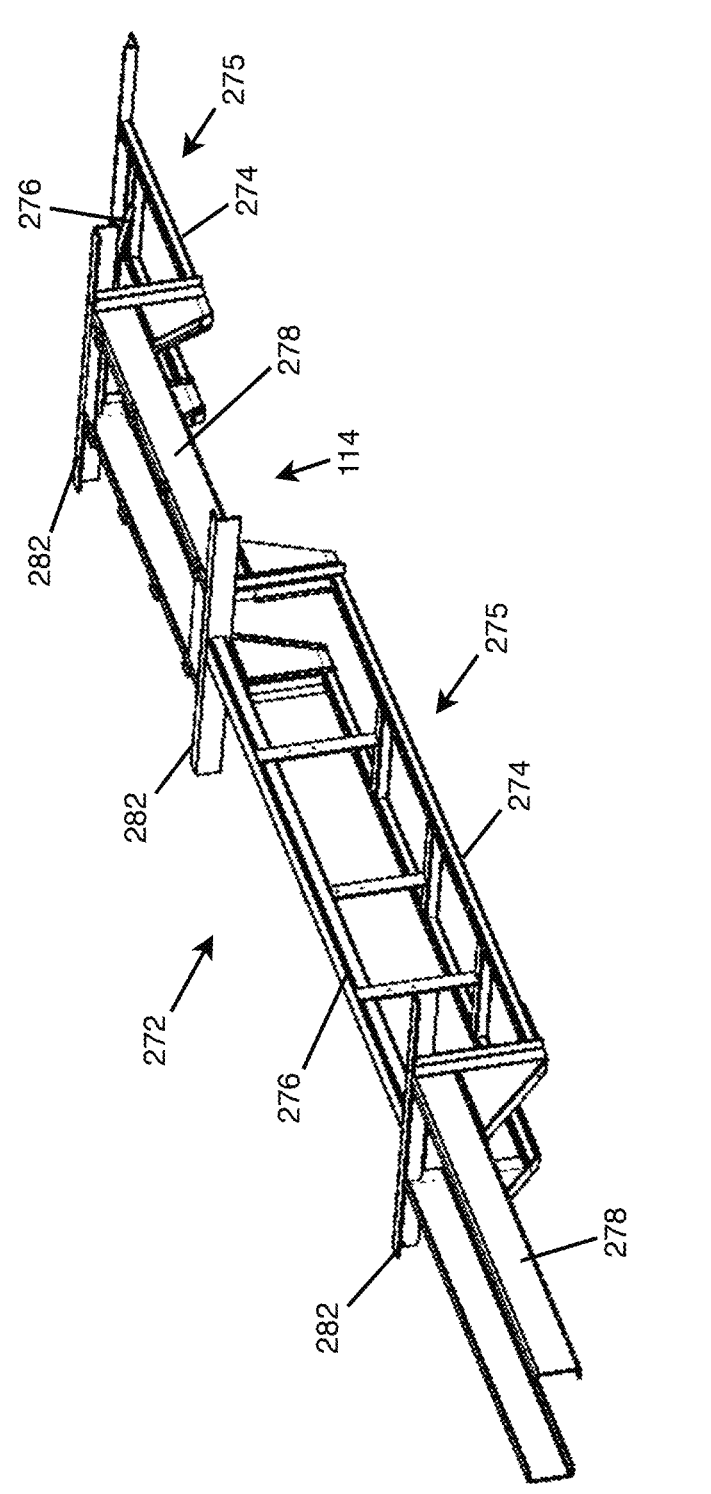
FIG. 4 is a perspective view of a chassis of a cargo container in accordance with an embodiment.

Referring additionally to FIG. 4, the chassis 272 comprises a first beam assembly 278 made of two sections. A first section of the beam assembly 278, frontmost, is designed for coupling to the cabin chassis of the vehicle, or to be mounted the attaching component of a hauled vehicle. The second section of the beam assembly 278, rearwards tom the first section, is adapted to provide wheelhouses 114 and to have a rear section the chassis 272 coupled thereto. The beam assembly 278 is adapted to extend in-between and bridge a low elevation sections of the chassis 272 and high elevation sections of the chassis 272. Between the first and second section of the beam assembly 278 takes place a first section of a lower deck 275 comprising a floor assembly 274 providing a support for a low floor portion, and a spine assembly 276 extending upwards and longitudinally preferably at the center of the chassis 272. The spine assembly 276 extends from the floor assembly 274 to, preferably, the level of the beam assembly 278. A second section of the lower deck 275 extends rearwards to the wheelhouses 114, with the spine assembly 276 extending potentially over a portion of the length of the section of the lower deck 275 rearwards to the wheelhouses 114, in the embodiment, lowering continuously from the second section of the beam assembly 278 rearwards. At the junctions of the sections of the beam assembly 278 with the sections of the lower deck 275 are transversal beams 282 spanning over the width of the chassis 272. The transversal beams 282 are adapted to provide structure away from the beam assembly 278 and the spine assembly 276.

Figures 5, 6:
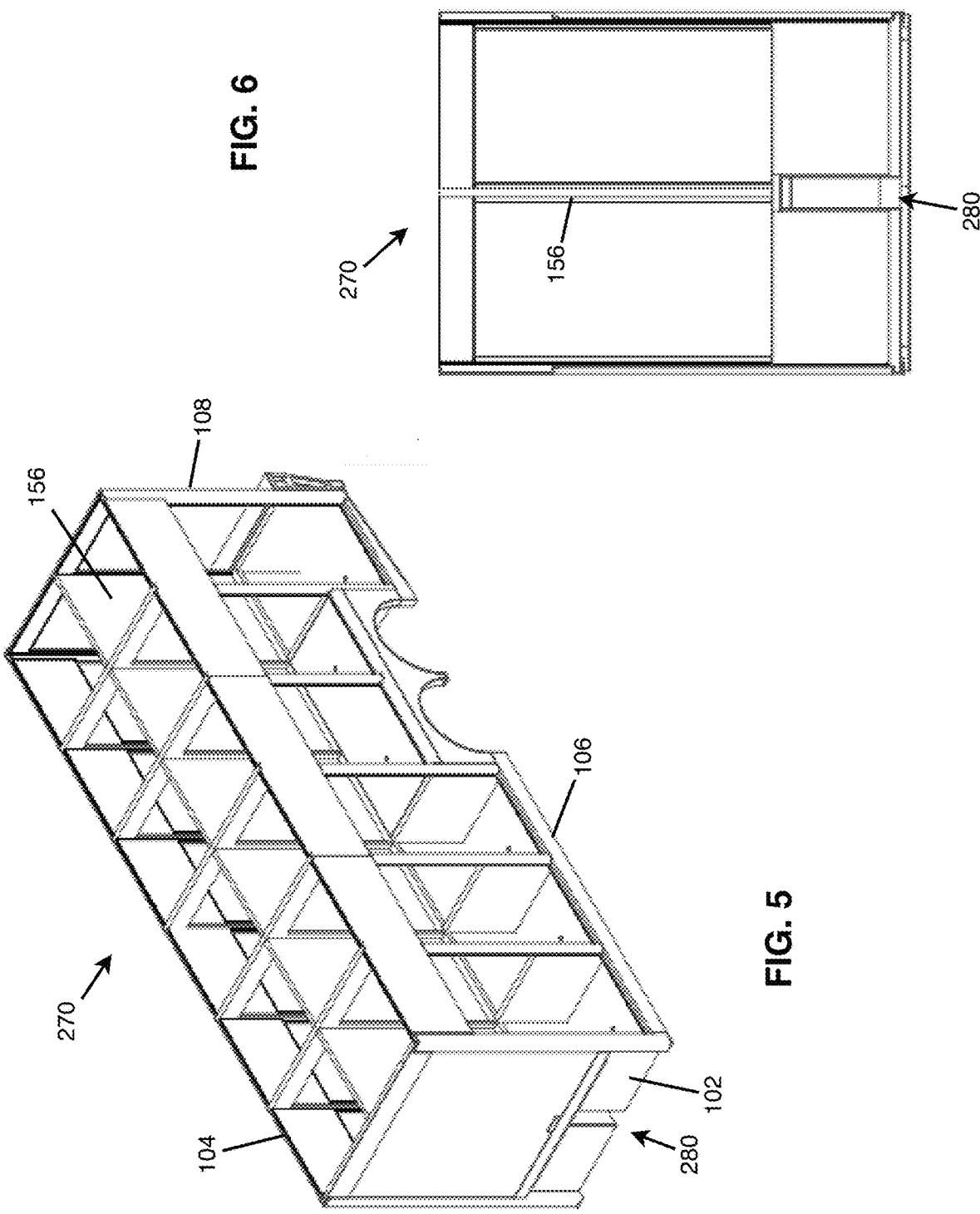
FIG. 5 is a perspective view of a body of a cargo container, with the exterior doors, the partition doors, the roof, and the external room removed in accordance with an embodiment.
FIG. 6 is a front view of a body of a cargo container in accordance with an embodiment.

Referring to FIG. 5 and FIG. 6, the body 270 (with some components absent) features a groove 280 at the center, adapted for the spine assembly 276 to take place therein. The spine assembly 276 (not illustrated in FIGS. 5 and 6) permits to the body 270 to be made of thinner sheet of material, and distributing weight over a substantial proportion of the length of the chassis 272. FIG. 6 shows that the longitudinal wall 156 lays on the top of the groove 280, and is thus supported by the spine assembly 276 of the chassis 272. Transversal beams 282 extend to the side, therethrough providing support for the side walls 104, 106, and the front wall 102 of the body 270.

Figures 7, 8:
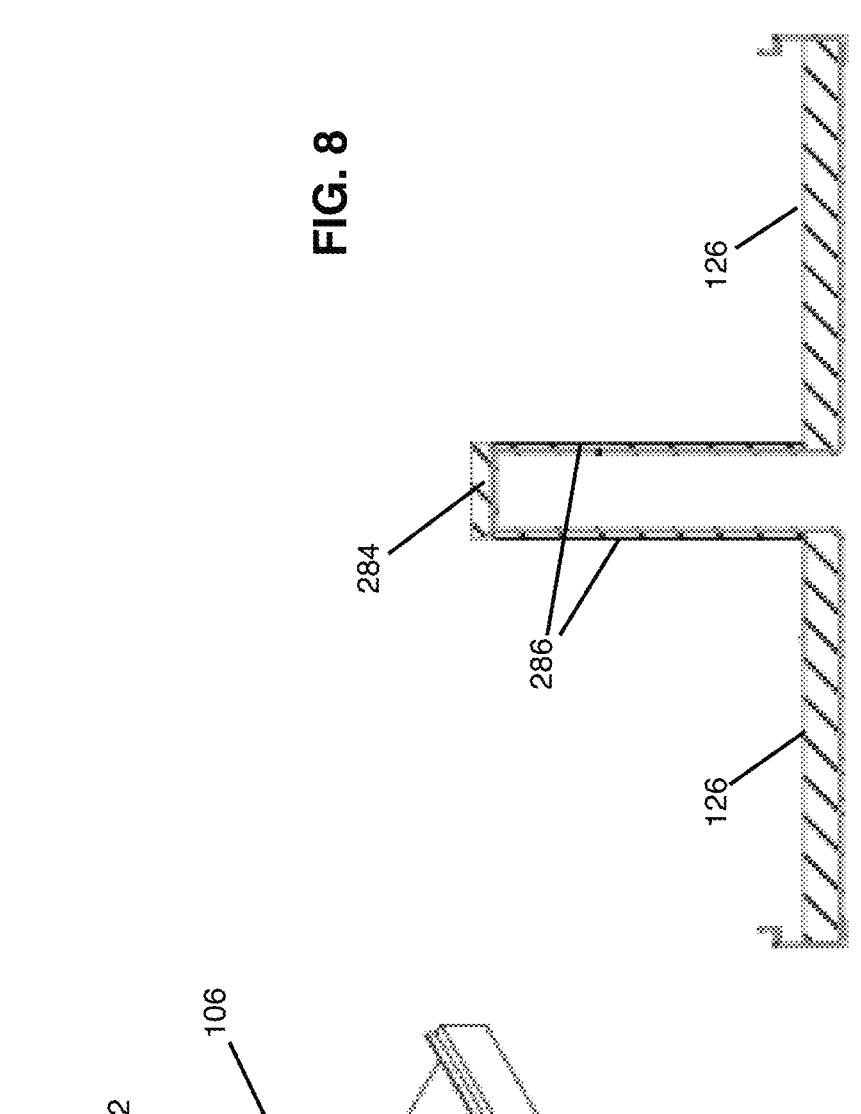
FIG. 7 is a perspective, longitudinal, cross-section of a portion body of a cargo container about transversally neighbor partition panels, depicting lower portions of the partition panels and of the side walls in accordance with an embodiment.
FIG. 8 is a cross-section view of a lower portion of a body of a cargo container between the wheelhouses and the front wall, comprising low floor portions in accordance with an embodiment.
Figure 9:
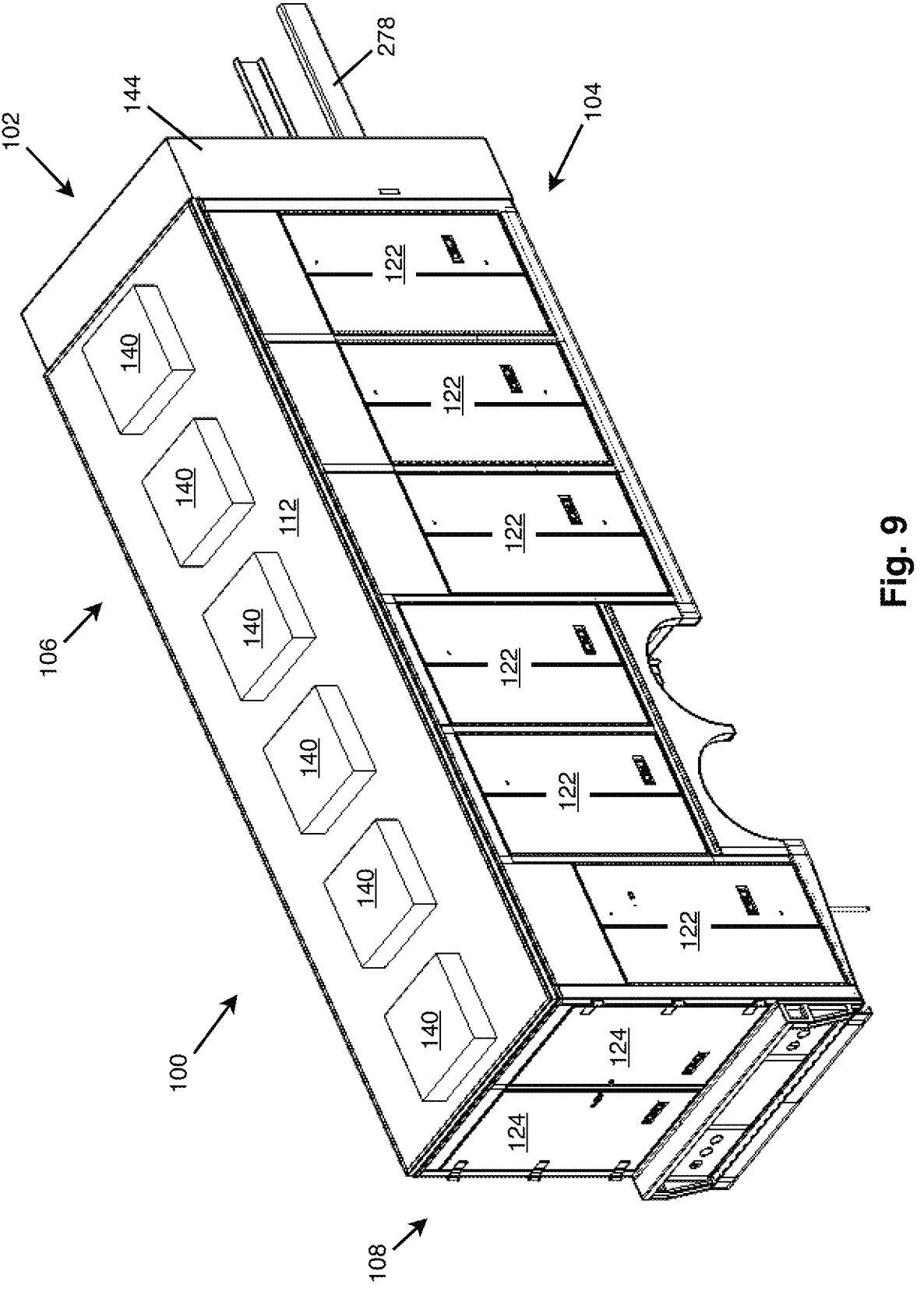
FIG. 9 is an elevated oblique rear perspective view of a cargo container comprising a plurality of climate-controllable rooms, the cargo container adapted be adapted to be mounted on a vehicle chassis to provide a delivery vehicle in accordance with an embodiment.
Figure 10:
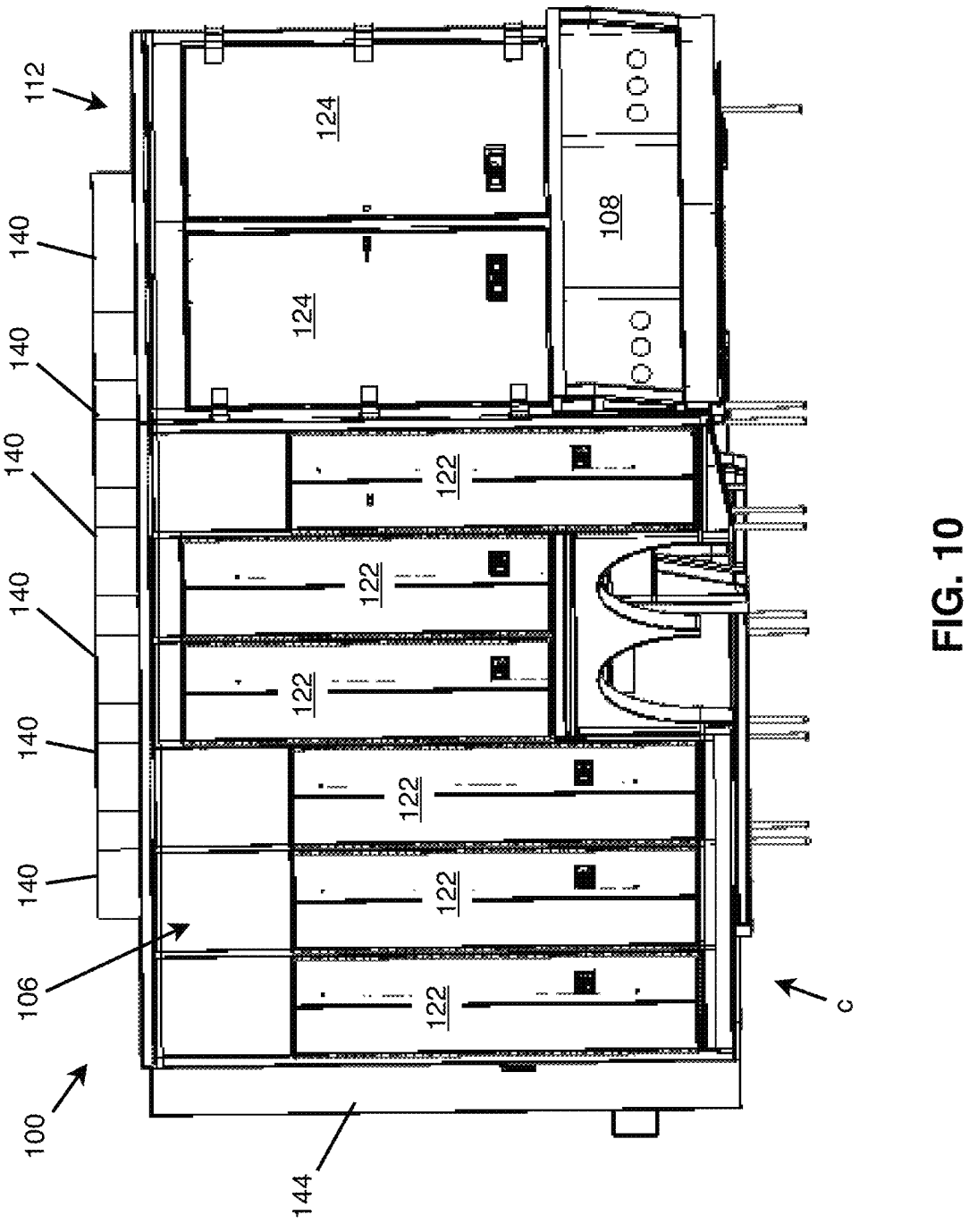
FIG. 10 is an oblique rear perspective view of the cargo container of FIG. 9 in accordance with an embodiment.
Figure 11:
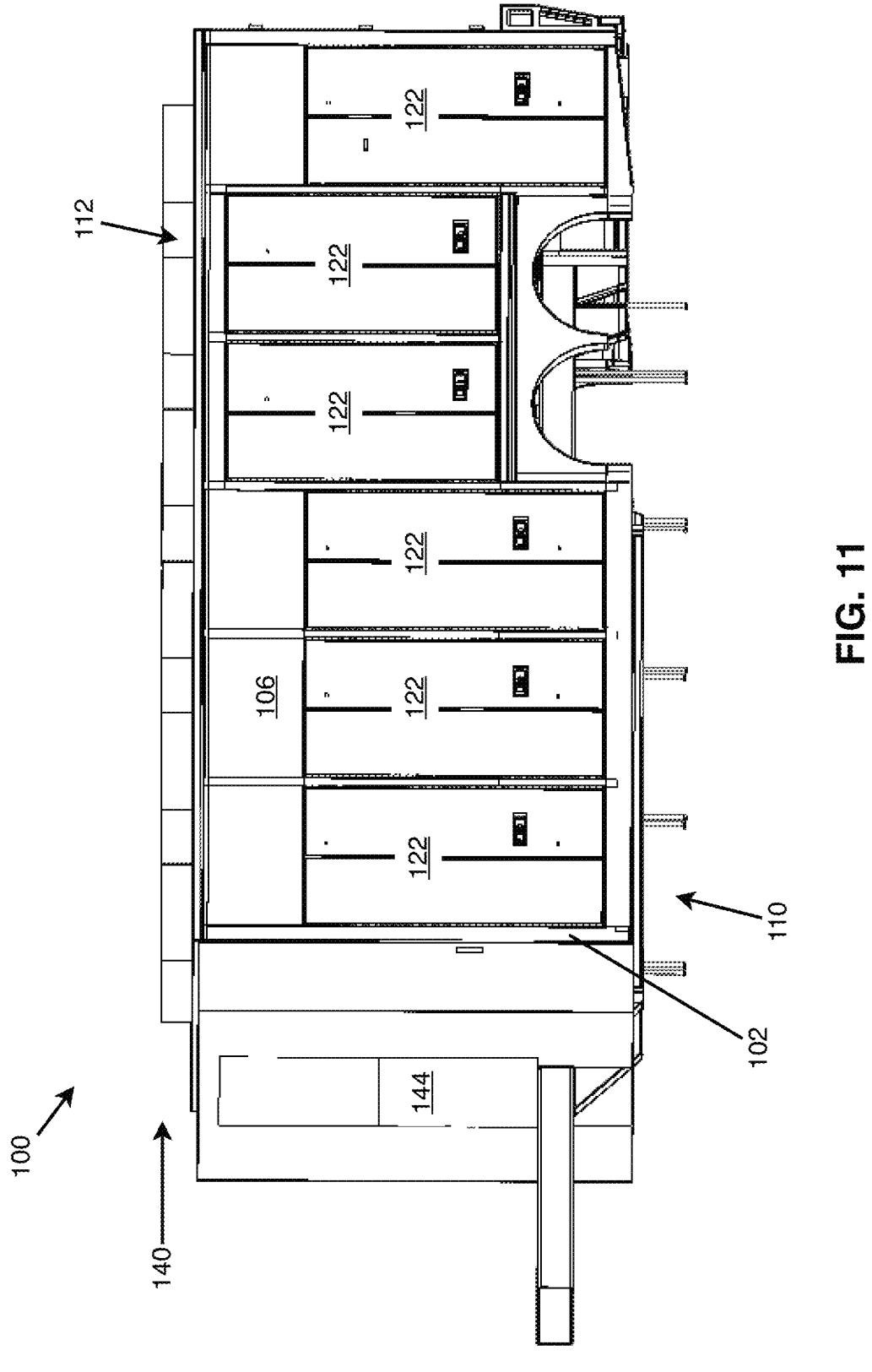
FIG. 11 is an oblique side view of the cargo container of FIG. 9 in accordance with an embodiment.
Figure 12:
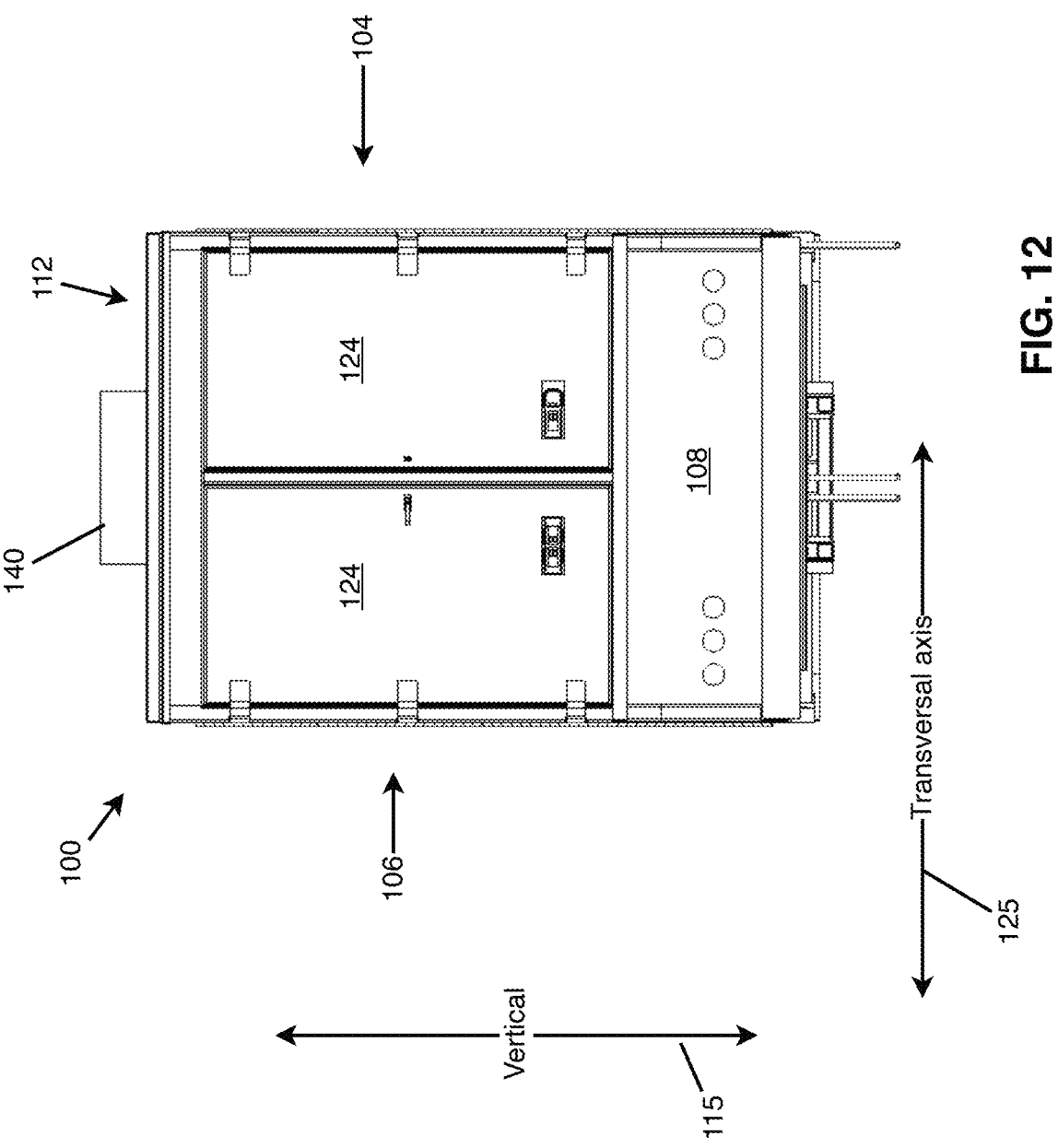
FIG. 12 is a rear view of the cargo container of FIG. 9 in accordance with an embodiment.

FIG. 7 and FIG. 8 depict a cross-section of a section of the body 270 about a partition panel 152 (not shown on FIG. 8). As illustrated, the structure of the body 270 and the chassis 272, comprising the spine assembly 276, allows for the body 270 to have thin walls 286 coupling the central floor section 284, on which lays the longitudinal wall 156, to the lower floor portions 126a-c, 126f. It allows to strengthen the floor portions 126a-c and 126f (see FIG. 17) that provide support for the side walls 104, 106.

Referring to FIG. 9, FIG. 10, FIG. 11, and FIG. 12, there is depict a cargo container 100 in accordance with an embodiment. The cargo container 100 comprises a front wall 102, a first side wall 104 on the driver's side, a second side wall 106 on the curb side of the cargo container 100 (in contrast to the driver's side of the cargo container 100), a rear wall 108, a floor 110, and a roof 112 forming cargo volume 130.

Accordingly, the cargo container 100 extends along a longitudinal axis 105 (see FIG. 19) extending from the front wall 102 towards the rear wall 108, with the side walls 104, 106 extending substantially parallel to the longitudinal axis 105 and substantially parallel to a vertical axis 115 perpendicular to the ground. The front wall 102 and the rear wall 108 extending substantially parallel to a transversal axis 125 extending from one side wall 104 to the other side wall 106, and transversal to the vertical axis 115. The floor 110 and the roof 112 are extending substantially parallel to the longitudinal axis 105 and the transversal axis 125.

It is worth noting that the structures of the walls, floor, and roof are described as single planar structures, but it is herein contemplated variation in the continuous characteristic, planar characteristic and angle of these structures.

Back to the cargo container 100 depicted in FIG. 9, FIG. 10, FIG. 11 and FIG. 12, the cargo container 100 comprises a series of doors, e.g. side doors 122, preferably used for getting merchandises thereout, and rear doors 124 providing access to interior rooms 135 (see e.g. FIG. 13) preferably to load the merchandises therein with the interior rooms 135 summing up to taking up to the whole cargo volume 130.

According to an embodiment, at least some of the side doors 122 are sized and hinged such as to providing an opening and space for a pallet to be inserted therethrough and be loaded therein.

In one embodiment, on the front portion of the cargo container 100 takes place an external room 144 accessible from the outside separated from the cargo volume 130. The external room 144 is designed to be accessible from the outside, without providing access to the cargo volume 130. The external room 144 is designated to house mechanical components that are not necessary to be located inside the cargo volume 130, e.g., hydraulic controls, energy management components.

Figure 13:
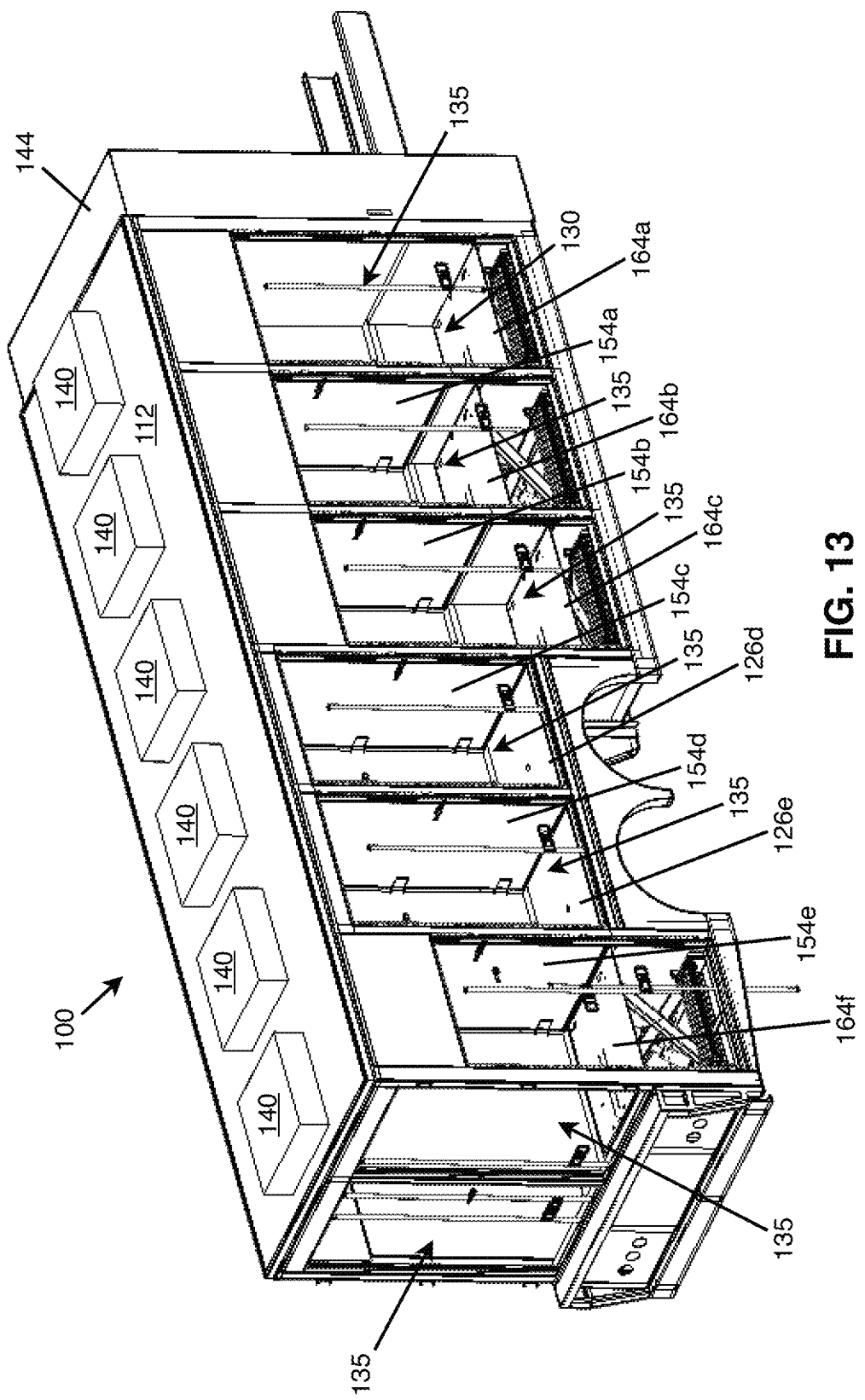
FIG. 13 is an elevated oblique rear perspective view of the cargo container of FIG. 9 with the foreground side doors removed and the rear doors removed in accordance with an embodiment.

Referring, inter alia, to FIG. 13, on the roof 112 takes place a plurality of conditioning units 140, e.g. refrigeration units, operatively and fluidly coupled to the interior rooms 135 located in the cargo volume 130. The conditioning units 140 are mounted to the roof 112 at the longitudinal centerline, with e.g. one conditioning unit 140 per side-by-side interior room 135. Conditioning units 140 could alternatively climatize different sub-cargo volumes 135. The plurality of conditioning units 140 are adapted to individually or collectively conditioning, e.g., climatizing one or more interior rooms 135. According to embodiments, one of more of the conditioning units 140 are adapted to warm, heat, and/or manage humidity in one or more interior rooms 135.

According to an embodiment (not shown), distinct conditioning units 140 are used for climatizing and heating. They may be installed in different locations, e.g. climatizing units on the roof 112, and heating units about the floor.

According to an embodiment, each one of the conditioning units 140 are designated to condition a single one of the interior rooms 135, the conditioning unit 140 and the interior room 135 being coupled through hoses in which travel refrigerant, with a fan operatively connected to the hoses being installed in the interior room 135.

According to an alternative embodiment (not shown), a central conditioning unit may be used, with control of flow of air in and out of the interior room being used to controllably conditioned the interior rooms 135. The central conditioning unit would be coupled to ducks in fluid communication with the interior rooms 135. These ducks would extend about the roof 112 on the interior side. Individual control of air flow in each room would be used to individually control conditioning of each interior room 135.

Accordingly, one or more conditioning units 140 are (fluidly) in operating connection with the interior rooms 135, preferably having each of the interior rooms 135 to-be-conditioned in operative connection with at least one conditioning unit 140. Thereby, a plurality, and preferably each one of the conditioning units 140 may be individually conditioned to the requirements of the merchandises to take place therein.

It is to be noted that for the cargo volume 130 to be conditioned and furthermore each of the interior rooms 135 to be individually conditioned, all interior dividing components, fix and mobile, are providing thermal insulation. Thermal insulation is set in walls and doors. Seals around the partition doors 154 are provided for interior rooms 135 to be fluidly sealed from each other when the interior partition doors 154 dividing one another are closed. Side doors 122 and rear doors 124 are also insulated and equipped with seals to insulate the interior rooms 135 from the external environment.

According to an embodiment, a single conditioning unit is associated with a pair of interior rooms 135 disposed side-by-side on the driver side and the curb side of the longitudinal wall 156, wherein conditioning of the two side-by-side interior rooms are controlled individually through control of refrigerating flow from the conditioning unit 140 to each of the interior rooms 135.

According to an embodiment (not shown), closable openings are present in at least one of interior partition doors 154 and the longitudinal wall 156 for equalizing temperature between neighbor interior rooms 135. These closable openings are, according to one embodiment, slidable panels.

Structures for bear the weight of the conditioning units 140 are provided through at least one of transversal lintels mounted to the top of the partition panels designed to distribute a portion of the weight of the conditioning units 140 to the longitudinal wall and the side walls, and support structure in the longitudinal wall such as providing bearing columns transferring the weight of the conditioning units 140 to the spine assembly 276.

Referring, inter alia, to FIG. 13, FIG. 14, FIG. 15, FIG. 16, FIG. 17, FIG. 18, and FIG. 19, the cargo container 100 is adapted for loading and unloading easily without affecting the merchandises stored in interior rooms 135.

The cargo container 100 features transversal partition panels 152 that are designed to controllably partitioning the cargo volume 130 into a plurality of interior rooms 135. The transversal partition panels 152 consists of a frame secured at its edges to the floor 110, the ceiling or roof 112, the longitudinal wall 156, and the side wall 104 or 106. The frame has an opening with a partition door 154 being rotatably secured thereto, the partition door being movable between a closed position in which the partition door isolates neighbor interior rooms 135 from one another, and an open position providing access to the adjacent interior room 135.

The cargo container 100 features a floor 118 having floor portions 126 unleveled relative to one another. More precisely, the cargo container 100 comprises wheelhouses 114 elevating the floor portions 126d, 126e located above the axle(s) (not shown on these figures). For optimal storage, the other floor portions 126a-c and 126f are lower than the floor portions 126d-e.

The cargo container 100 is adapted to be loaded through the rear doors 124. To ease the process, a leveled floor is required, leveled with the accessible external floor 128 used to enter the cargo container 100. For that objective, surfaces of the floor portions 126d-e and of the external floor 128 are designed at the same level. Floor portions 126a-c and 126f, that are lower, comprises height-adjustable surface 164 that are controllably raisable to the same level thereof, thereby providing provisionally and individually controllably a levelled floor for easy loading of merchandises therein.

FIG. 13 shows that the cargo container 100 with the side doors 122 (shown, inter alia, in FIG. 12) that can be used for unloading merchandises removed from the figure, and the rear doors 124 (shown, inter alia, in FIG. 12) used for loading the merchandises also removed from the figure. It depicts the cargo volume 130 with a series of interior rooms 135a-f that are isolated from one another, the rearmost interior rooms 135f on the driver side and curb side being accessible both through side doors 122f and rear doors 124.

FIG. 13 depicts height-adjustable surfaces 164 at different heights. In the example, the external floor 128, the height-adjustable surface 164f raised to the same level as the external floor 128, and the floor portions 126d-e form a leveled floor. When the partition doors 154d-e dividing them are in an open position, e.g., a forklift or other loading apparatus, may be driven through the rear doors 124 with a pallet, and the pallet being moved into the interior room 135d, the third interior room from the rear. The forklift may be driven back out of the cargo container 100. Afterwards, the interior partition door 154d (see FIG. 19) rearwards to the interior room 135d may be moved in a closed position, closing the interior room 135d ready to be conditioned to the appropriate temperature based on the requirements for the merchandises left in the interior room 135d. The process may be repeated to the interior rooms 135e and 135f. Furthermore, after a first set of merchandises being left in interior room 135f, the height-adjustable surface 164f of the interior room 135f may be lowered to receive additional merchandises.

Through this process, merchandises may be easily and sequentially loaded through the rear doors 124 over a leveled floor in the interior rooms 135a-f. Portions of the surface used to drive onto and place merchandises onto may be sequentially lowered one after another, from interior room 135a to interior room 135f, to optimize the storage of merchandises. The volume of merchandises can thus be optimized for each one of the interior rooms 135, and the interior rooms 135 may be individually conditioned swiftly after being filled without needing for the whole loading of the cargo container 100 to be completed.

Figure 15:
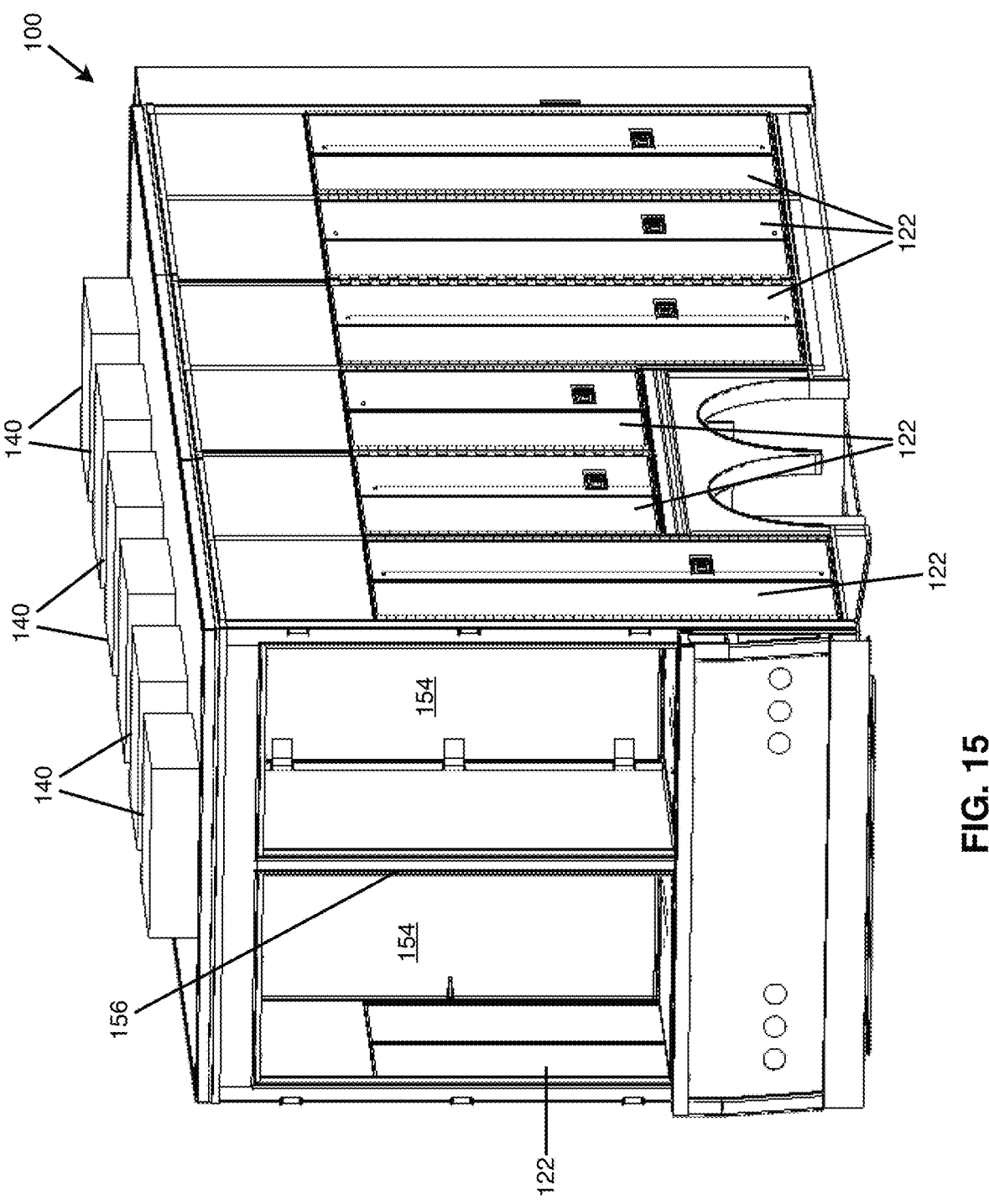
FIG. 15 is a rear oblique view of a cargo container in accordance with an embodiment, with the rear doors removed and one partition door removed on the curb side of the cargo container.
Figure 16:
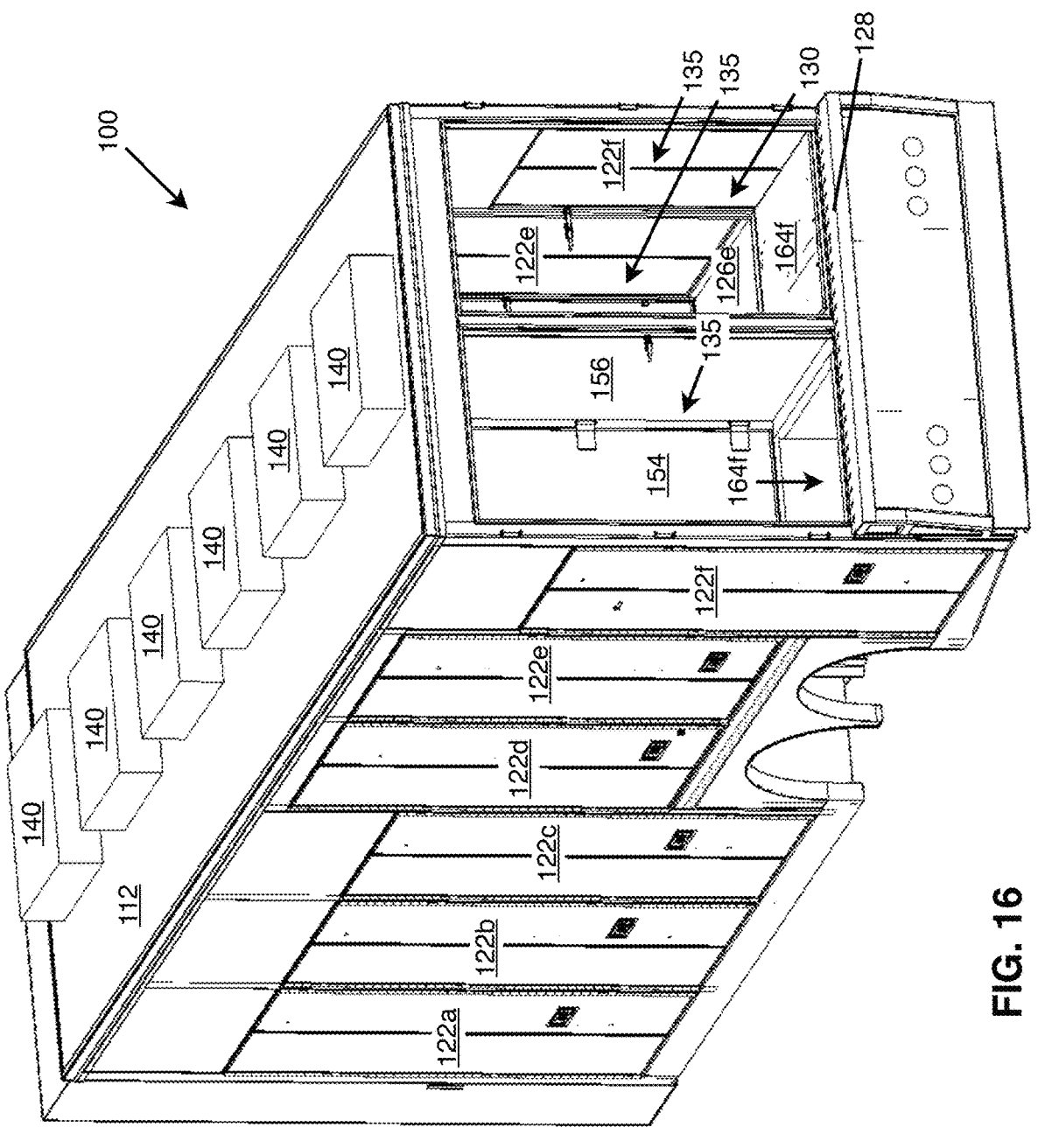
FIG. 16 is a rear-oblique perspective view of a cargo container in accordance with an embodiment, with the rear doors removed, one partition door removed on the curb side of the cargo container, loading floor not leveled on the driver side, and loading floor on the curb side of the cargo container leveled.

Referring additionally to FIG. 15 and FIG. 16, interior partition doors 154, in the opened position, are allowing rear access for merchandises loading in the cargo volume 130 with a forklift and merchandise mounted to pallets. The interior partition doors 154 are defining and controllably delimiting individual interior rooms 135. Alternatively, interior partition doors 154 can be kept open to combine interior rooms 135 to share the same temperature and combine power of conditioning units 140 in some embodiments.

Figure 14:
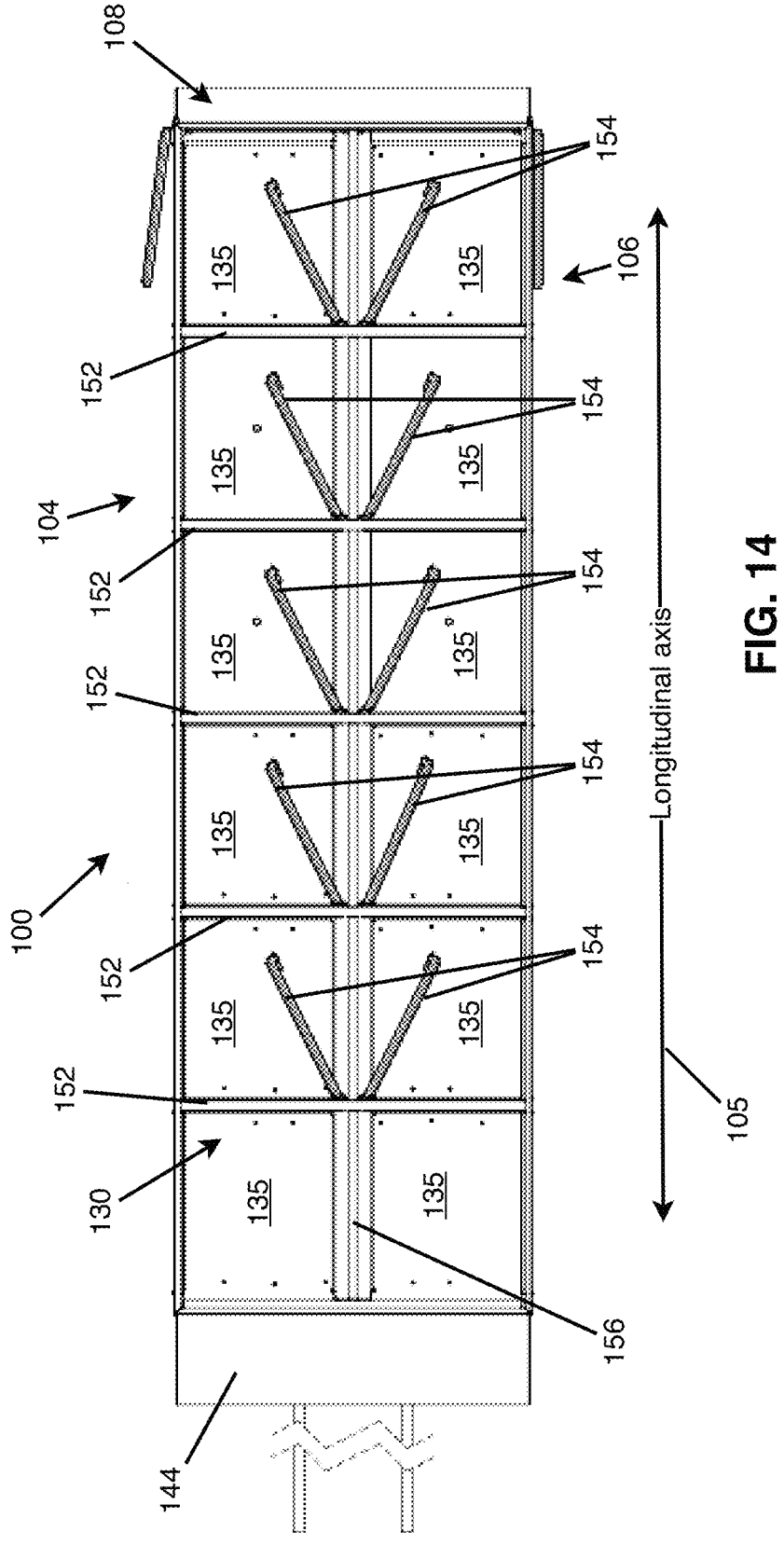
FIG. 14 is a plan view of the cargo container of FIG. 9 with the roof removed and the partition doors opened in accordance with an embodiment.
Figure 20:
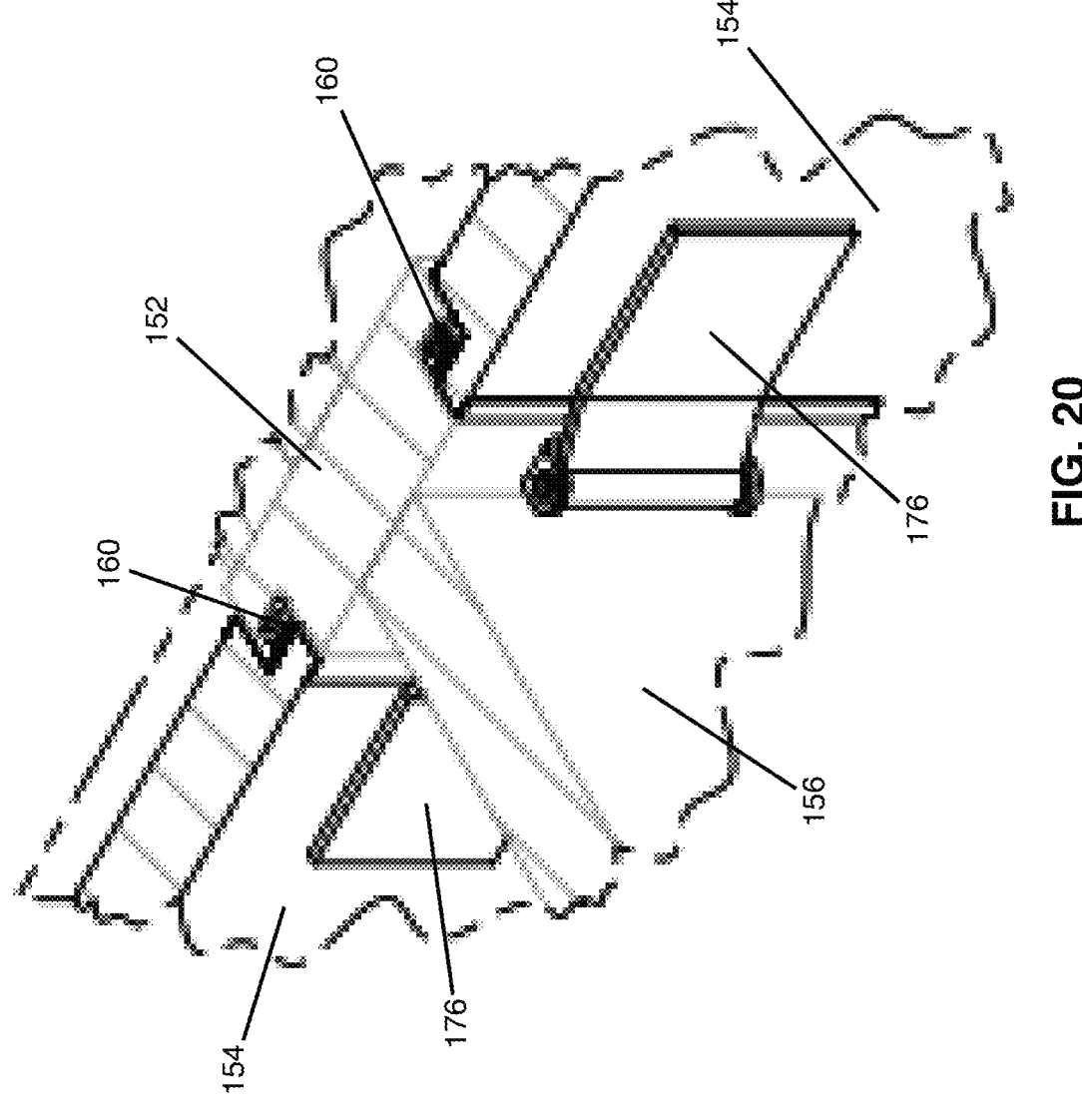
FIG. 20 is a close-up perspective cross-section view of a section of a cargo container of FIG. 9 depicting the junction of the longitudinal wall with partition panels comprising partition doors in accordance with an embodiment.

Referring additionally to FIG. 20, insulation is provided to efficiently insulate the interior room 135 when isolated from one another. The longitudinal wall 156, the transversal partition panels 152, and the interior partition doors 154 comprise thermal insulating material allowing insulation of individual interior rooms 135 from one another. On the edges of the transversal partition panel 152 are mounted seals 160 ensuring airtight partitioning of the interior rooms 135. Not shown, the interior partition doors 154 may also comprise flexible insulating material about the bottom edge, preventing or limiting air and heat exchange between neighbor interior rooms 135 at this location. Thus, the cargo container 100 is designed for interior rooms to be easily and efficiently set to different temperatures. Hinges 176 are mounted to limit obstruction of passage between interior rooms 135 when in an interior partition door 154 is in an opened position. The interior partition doors 154, as depicted in FIG. 14, are rotating in a rearwards direction towards the longitudinal wall 156, providing least obstruction to passage or merchandise, allowing to interior rooms 135 as soon as all merchandises to be loaded in that the particular interior room 135 being loaded, and providing no obstruction to access of the merchandises by the side doors 122 regardless of them being in the opened position or the closed position.

According to an embodiment, the seals used at the bottom of the partition doors 154 are accordion-shaped wide seals designed for large gaps, made of EPDM foam, for instance McMaster-Carr™ Push-on seal for large gaps. According to another embodiment, the seals are of the type "shoe sweep" comprising a rubber bottom designed to sweeping the floor as the partition door 154 is open/closed, such as NGP 13T6 door shoe sweep from Trademark Hardware™. For the edge of the partition doors 154, one of semi-circular rubber seals made of EPDM rubber, e.g. McMaster-Carr™ weather-resistant rubber seal or Trademark Hardware™ Pemko™ #EV9 Vinyl Insert, or seals designed for coolers and cold apparatuses can be used according to embodiments. For external side doors 122 and rear doors, same types of seals may be used, for instance only to seal the edges or both seal the edges and seal the bottom of the doors 122, 124.

Alternative configurations with changes in one or more of the described features are also contemplated through the present description.

According to embodiments, type of hinges used may allow for some or all of the interior partition doors 154 to be removable.

According to embodiments, a locking mechanism may also me mounted to the interior partition doors 154. The locking mechanisms may be used to secure the interior partition doors 154 in positions, both opened position and closed position.

For illustration, FIG. 15 and FIG. 16 depict a situation where the rearmost interior room 135 of the cargo volume 130 on the driver side is not accessible from the rear since its height-adjustable surface 164 is not raised, and more precisely lowered to the height of the bottom of the side door 122*f*, in the unloading position. On the curb side, FIG. 15 and FIG. 16 depict two interior rooms 135 that are accessible for loading, the height-adjustable surface 164*f* being leveled to the same height as the external floor 128 and the floor portion 126*e* for easy rear loading of merchandises in these interior rooms 135*e-f.*

According to an embodiment, the rear doors 124 are sized and hinged such as to providing an opening and space for pallets to be inserted therethrough and be loaded therein. Structure, such as the frame of the interior partition doors 154, the size of openings for the interior partition doors 154, and hinges 176 of these interior partition doors 154, are designed, located, and sized for a pallet and a forklift to pass through the passage created when an interior partition door 154 is in an open position.

For illustration, FIG. 14 is an elevated view of the cargo container 100 with the roof 112 removed showing partition into interior rooms 135 of the cargo volume 130. Transversal partition panel 152 are dividing the cargo volume 130 into longitudinally neighboring interior rooms 135, such partition being controllable by opening and closing partition doors 154, allowing to selectively set the volume of the interior rooms 135. A longitudinal wall 156 extending from the front wall 102 to the rear wall 108 divides the cargo volume 130 into side-by-side transversally neighboring interior rooms 135. The longitudinal wall 156, combined with the transversal partition panel 152 including the partition doors 154, rigidifies the structure of the cargo container 100 as explained below. With these structures, the cargo container 100 is far more rigid that one without the longitudinal wall 156 and the transversal partition panel 152, decreasing the requirements in e.g., thickness of material for the external walls, or reinforcement structures to me mounted to the external walls.

Figures 17, 18:
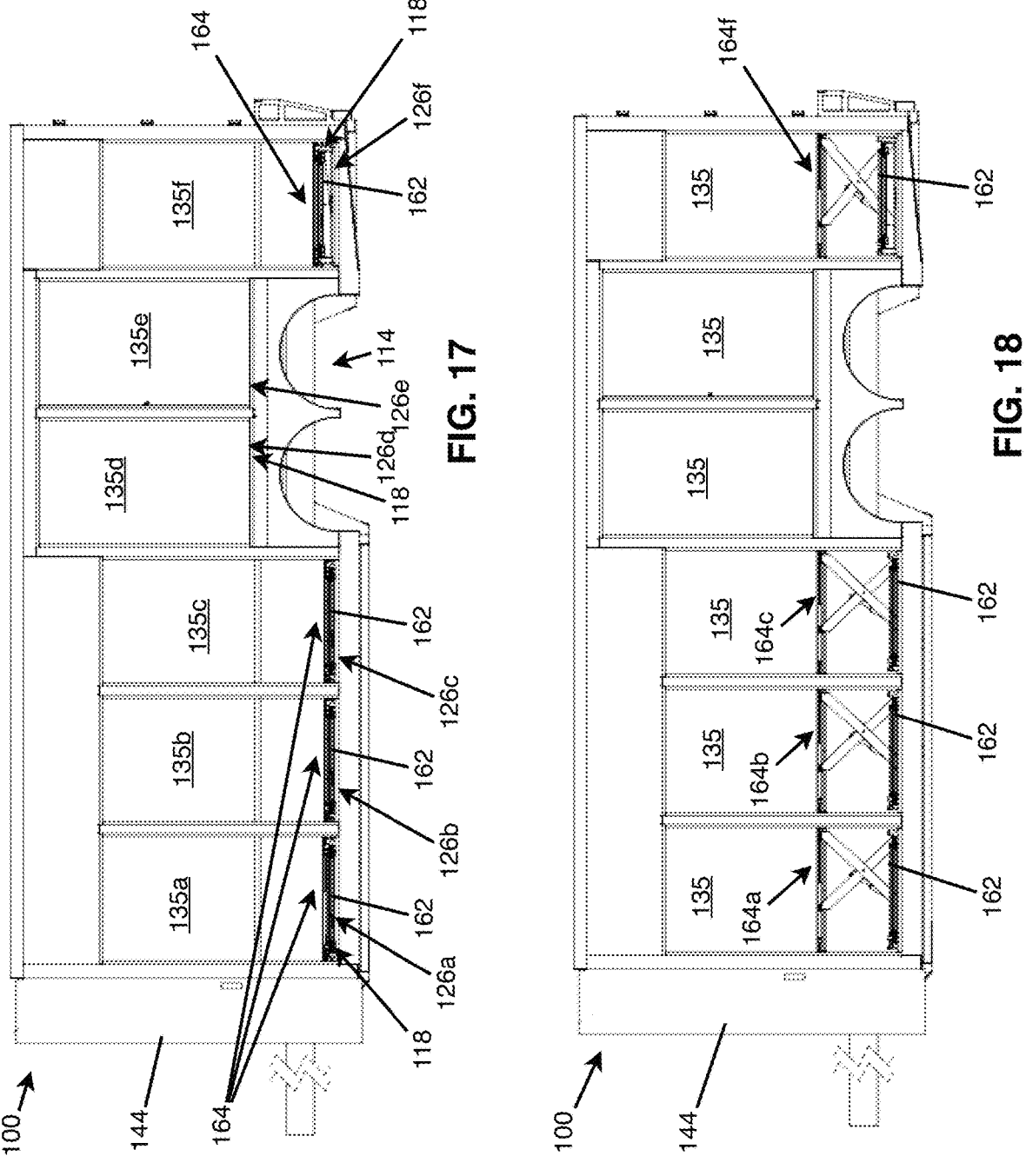
FIG. 17 is a side view of the cargo container of FIG. 9 with the side doors removed and vertically movable floor portions at their lowest, unloading position in accordance with an embodiment.
FIG. 18 is a side view of the cargo container of FIG. 9 with the side doors removed and vertically movable floor portions raised in an upper, loading position in accordance with an embodiment.
Figure 19:
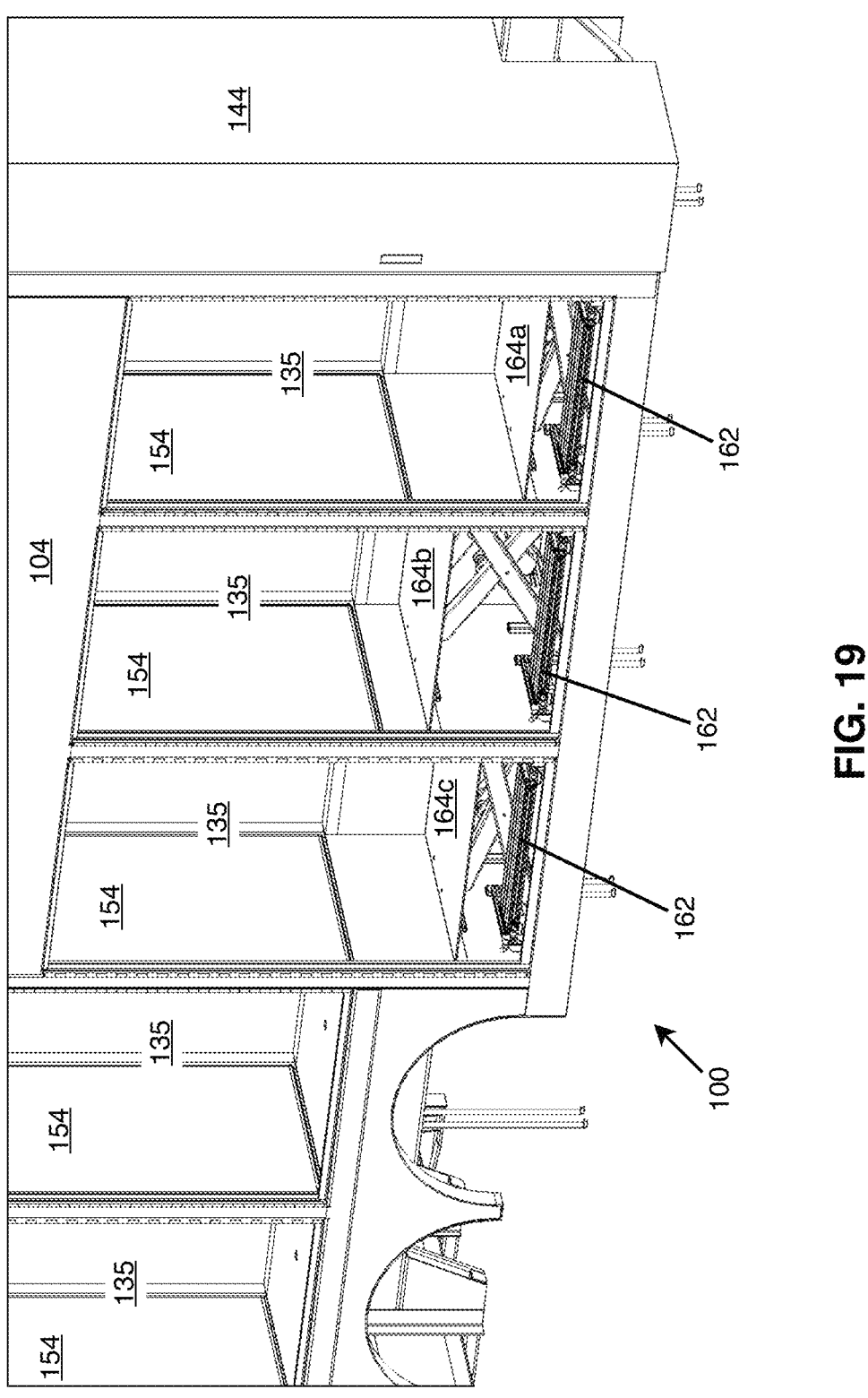
FIG. 19 is a partial perspective view of the cargo container of FIG. 9 with side doors removed and vertically movable floor portions raised in different intermediary positions in accordance with an embodiment.

FIG. 17, FIG. 18, and FIG. 19 depict the cargo container 100 with raising floor system 162 raisable relative to their respective floor portions 126 of the cargo volume 130, adjusting the height of the height-adjustable surface 164. The raising floor system 162 are depicted with the height-adjustable surface 164 at their lowest position in FIG. 17, and at a raised position in FIG. 18 and FIG. 19, providing in position of FIG. 18 and FIG. 19 a leveled floor leveled with the external floor 128 rendering possible to easily load the cargo volume 130 from the rear.

According to an embodiment, a plurality of raising floor systems 162 allow to vertically move individually controllable height-adjustable surfaces 164.

According to an embodiment, the raising floor systems 162 are powered hydraulically, powered through an electric motor (not depicted). Electric and/or hydraulic conduits (not depicted) are extending in the groove, limiting obstruction they may provide.

According to an embodiment, the raisin floor systems 162 are equipped with position control components, such as sensor(s) that provide information on position of the height-adjustable surfaces 164 and/or components of the raison floor system 162.

It is to be noted that such controllable space allows to optimize the volume of merchandises to store in the interior rooms 135, thus in the cargo volume 130, and to lower them to ease access to them through the side doors 122 when needed.

Figure 38:
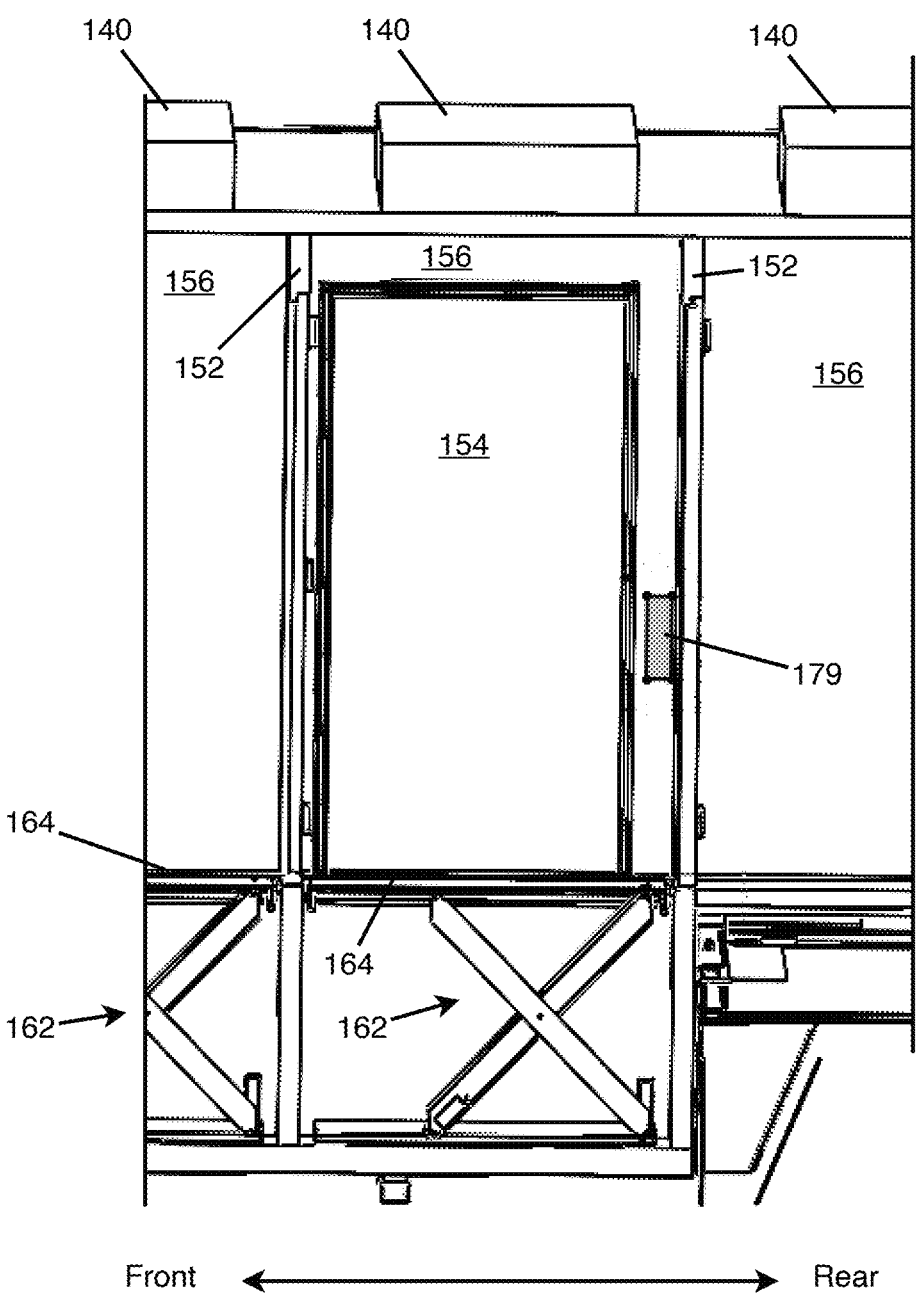
FIG. 38 is a side view of a section of a cargo container with the side wall removed, showing a room, a section one room frontwards, and a section of one room rearwards, in accordance with an embodiment.

It is to be noted that for easy control of the positions of the height-adjustable surfaces 164, control panels 179 (see FIG. 38) are mounted to the longitudinal wall 156, rearwards to the position where the rear edge of the partition doors 154 are in an opened position, extending aside the longitudinal wall 156. The control panels 179, located between the rear edge of the partition doors and the rearwards neighbor partition panel 152 or rear wall 108, always provide access to control the raising floor system 162 from the rearwards neighbor room. Such configuration allows to modify easily and rapidly the position of the height-adjustable surfaces 164 as the loading process evolves. A control console (not depicted) may further be mounted to the cabin of the vehicle, providing a centralized control of the raising floor systems 162. The control console may further provide visual indication on the position of the each of the height-adjustable surfaces 164, e.g. for security purposes.

According to an embodiment, the control panels 179 comprise a toggle switch, allowing through this control only two static positions, which are a lowered position and a raised position of the height-adjustable surface 164. The control panels 179 are easily reachable regardless of the position of the height-adjustable surface 164 of the room since located close to the rear partition wall 152 of the room, thus reachable without having to step on the height-adjustable surface 164 of the room or to overhang above a lowered height-adjustable surface 164.

It is also to be noted that the raising floor system 162 requires a strong floor structure, but avoid the need of reinforced wall structures that e.g., systems using pulleys to pull up floors using systems mounted to the walls as described in the prior art would require.

Figure 21:
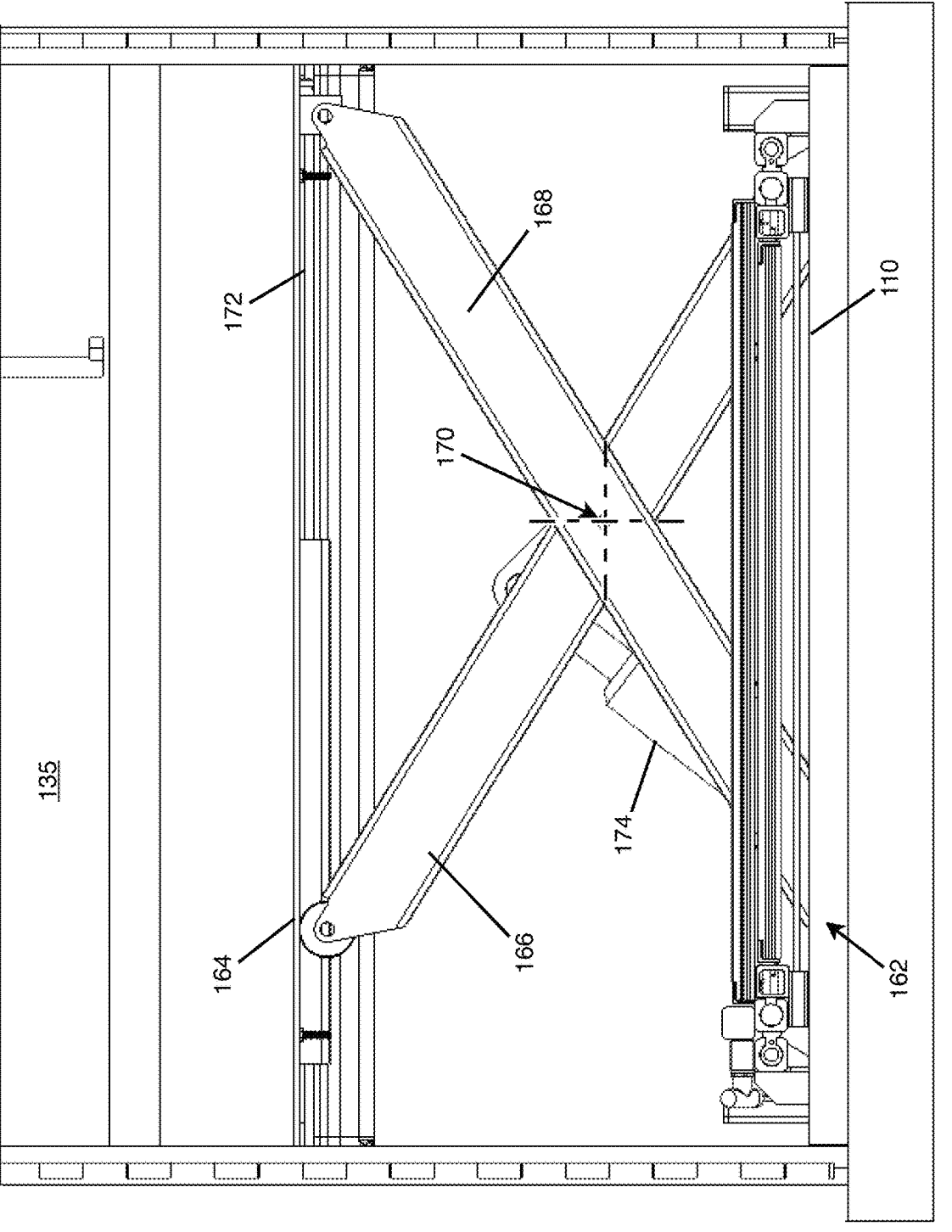
FIG. 21 is closeup side partial view of a room of the cargo container of FIG. 9, with a vertically movable floor portion raised in an intermediary position in accordance with an embodiment.

Referring additionally to FIG. 21, the raising floor system 162 of each of the interior rooms 135 are controllable independently from each other, allowing to have height-adjustable surfaces 164 at different height in interior rooms 135.

The raising floor system 162 consists of a scissor-based assembly that comprises a pair of member sets 166, 168 rotatably coupled to each other at a scissor axis 170. A panel 172 providing the height-adjustable surface 164 is mounted to the member sets 166, 168 distant from the floor 110. A linear actuator 174 that is extendable, is adapted to push one or both of the member sets 166, 168 (based on their anchoring positions), resulting in the scissor axis 170 raising, and the height-adjustable surface 164 along therewith. According to the depicted embodiment, to provide a height-adjustable surface 164 remaining parallel to the floor 110, some extremities of the member sets 166, 168 are fixedly anchored while some are slidingly anchored to component they are coupled to.

In a preferred embodiment, the height-adjustable surfaces 164 are raisable to at least the same level as the external floor 128 (see FIG. 16) about the rear doors 124, thus being able to provide a leveled flood extending from the rear wall 108 to the front wall 102.

One can appreciate from e.g., FIG. 13 and FIG. 16, that the interior partition doors 154 are embodied with a vertical length and position corresponding to the leveled floor position of the height-adjustable surface 164 of the raising floor system 162. Thereby, when the interior partition doors 154 are in the opened position, and the movable floor portions are set to the leveled position, the floor provides a uniform leveled flat floor from the rear doors 124 to the front interior wall 102.

Referring now to FIGS. 22 to 32, FIG. 34, FIG. 35, and FIG. 36, a shelving system 180 for the cargo container 100 and its components are depicted in accordance with an embodiment. The shelving system 180 is a lightweight and robust solution adapted to take place in interior rooms 135 to provide adjustable shelving that may easily be mounted to hold merchandises or collapsed under merchandises. Furthermore, the shelving system 180 is adapted to be movable between a collapsed position in which the shelving system 180 provides a surface to be driven over by e.g., a forklift, a pallet jack or a stacker, and an extended position in which the shelving system 180 provides shelving adapted to receive merchandises.

Figure 22:
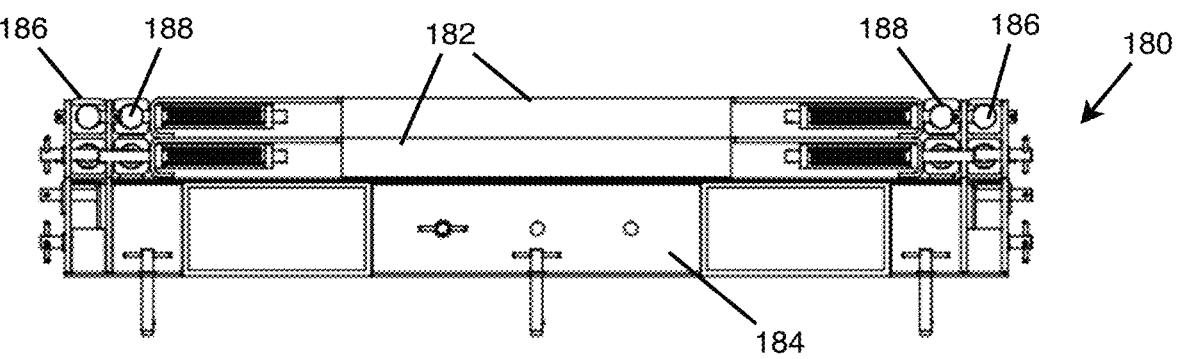
FIG. 22 is a front view of a shelving system adapted to be installed in a room of the cargo container of FIG. 9 in accordance with an embodiment, wherein the shelving system is depicted in a first collapsed position.
Figure 23:
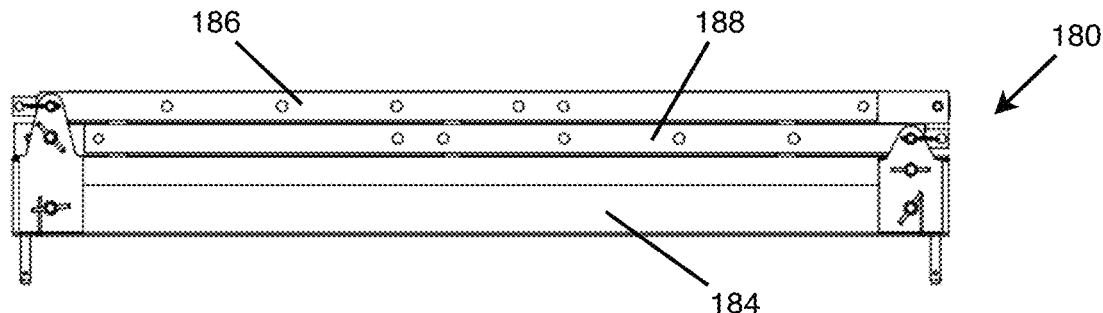
FIG. 23 is a side view of the shelving system of FIG. 22 in accordance with an embodiment, wherein the shelving system is depicted in the first collapsed position.
Figure 24:
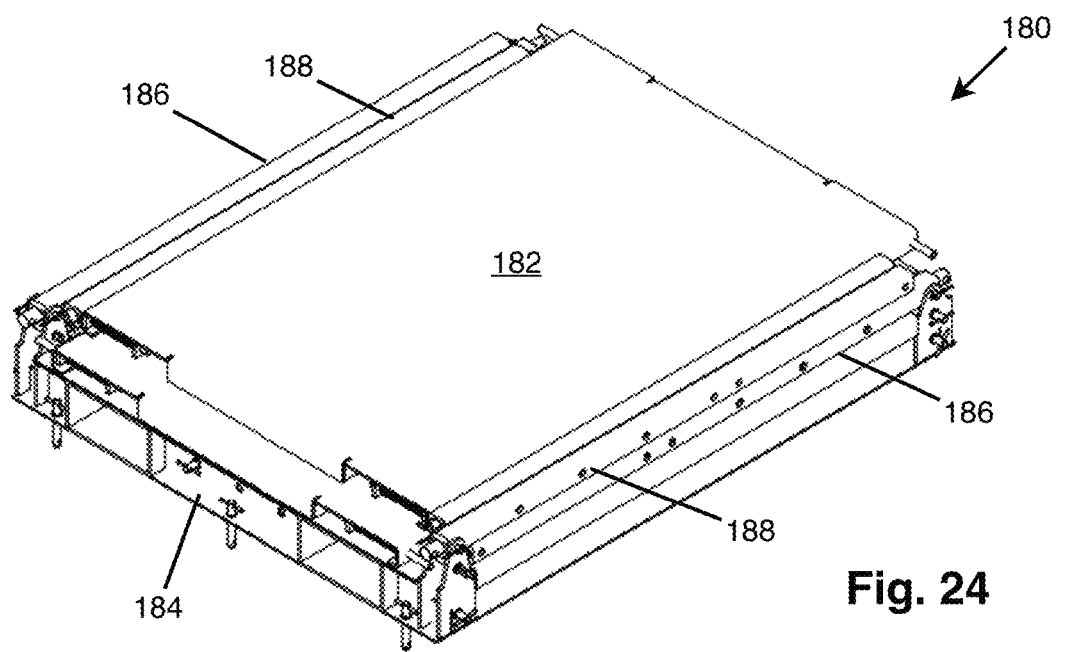
FIG. 24 is a perspective view of the shelving system of FIG. 22 in accordance with an embodiment, wherein the shelving system is depicted in the first collapsed position.

FIG. 22, FIG. 23 and FIG. 24 depict the shelving system 180 is a first collapsed position, providing no additional shelving while providing a solid surface for a e.g., forklift to be driven onto.

In accordance with the shown embodiment, the shelving system 180 comprises two shelves 182a and 182b, a platform 184, rear telescopic frames 186 rotatably mounted to the platform 184, and front telescopic frames 188 rotatably mounted to the platform 184. The overall footprint of the shelving system 180 is adapted to substantially correspond to or to be slightly smaller than the floor portion available per interior room 135 such that it may be inserted in an interior room 135 with a minimized loss of space.

Figure 25:
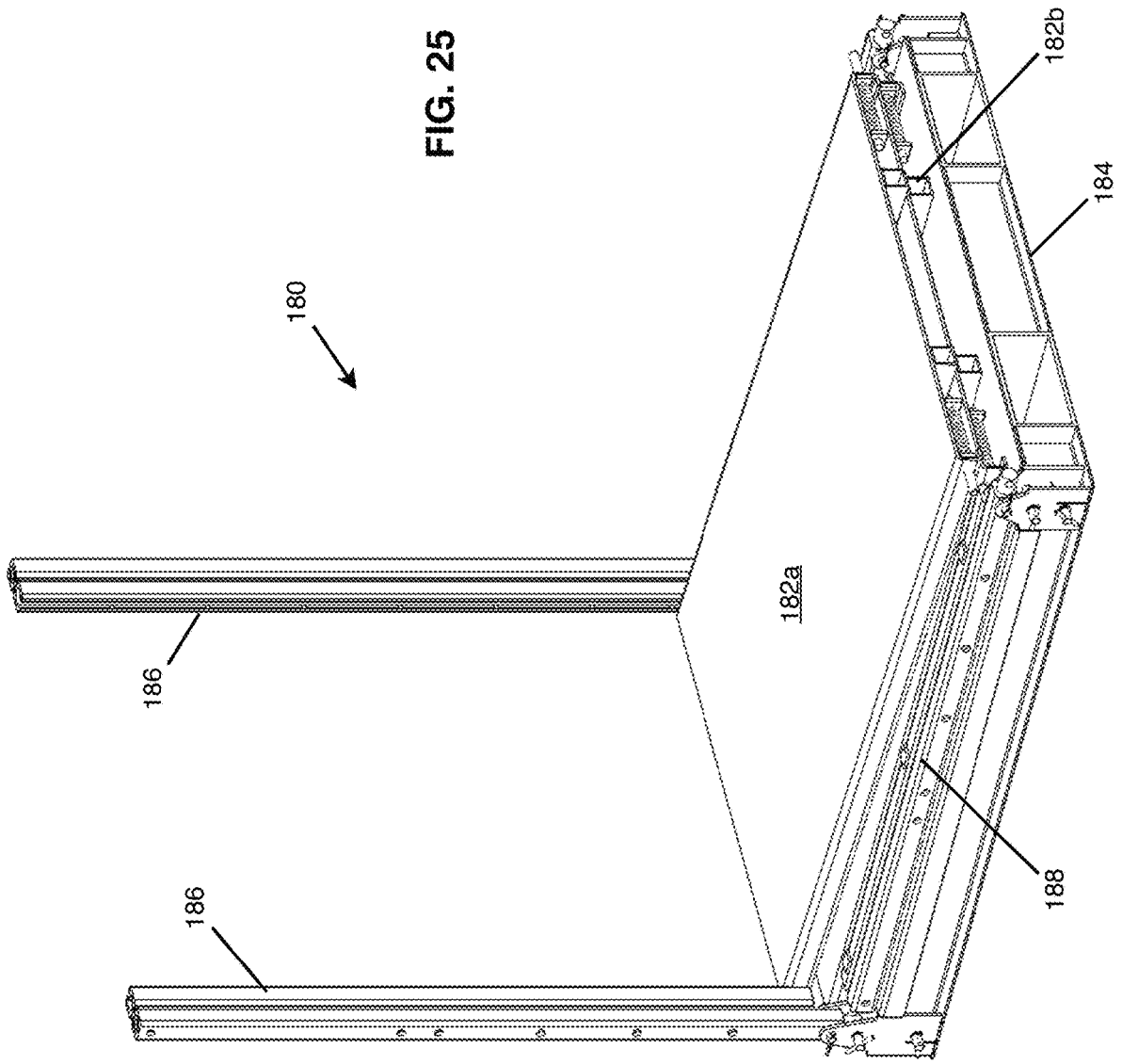
FIG. 25 is a perspective view of the shelving system of FIG. 22 in accordance with an embodiment, with the shelving system depicted in a first intermediary position between the collapsed position and an extended position.

FIG. 25 depicts the shelving system 180 in a second position in which the top members 194 of the rear telescopic frames 186 are rotated in a raised position and locked at their base with e.g., a locking pin into that raised position. The rear locking pins 198 (see FIG. 33) of the shelf 182a are pinned into the top members 194, having the rear portion of the shelf 182a set to raise at the same time as when the top members 194 will be raised.

Figure 26:
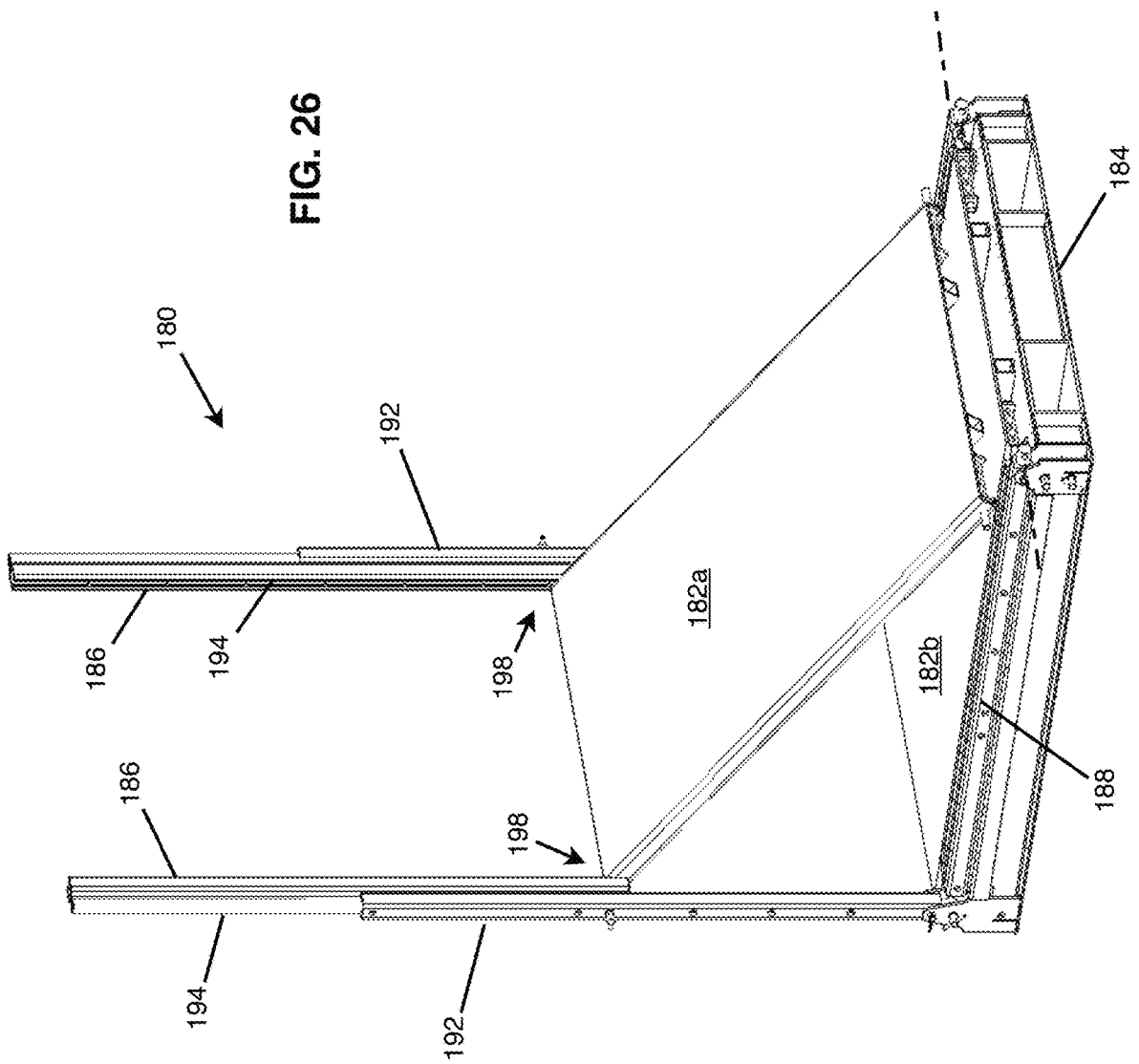
FIG. 26 is a perspective view of the shelving system of FIG. 22 in accordance with an embodiment, with the shelving system depicted in a second intermediary position between the collapsed position and the extended position.

FIG. 26 depicts the shelving system 180 in a third position in which the top members 194 are raised, raising the central-side of the shelf 182a at the same time.

It is worth noting that, according to an embodiment, the top members 194 may be adjustably raised between different positions.

Figure 27:
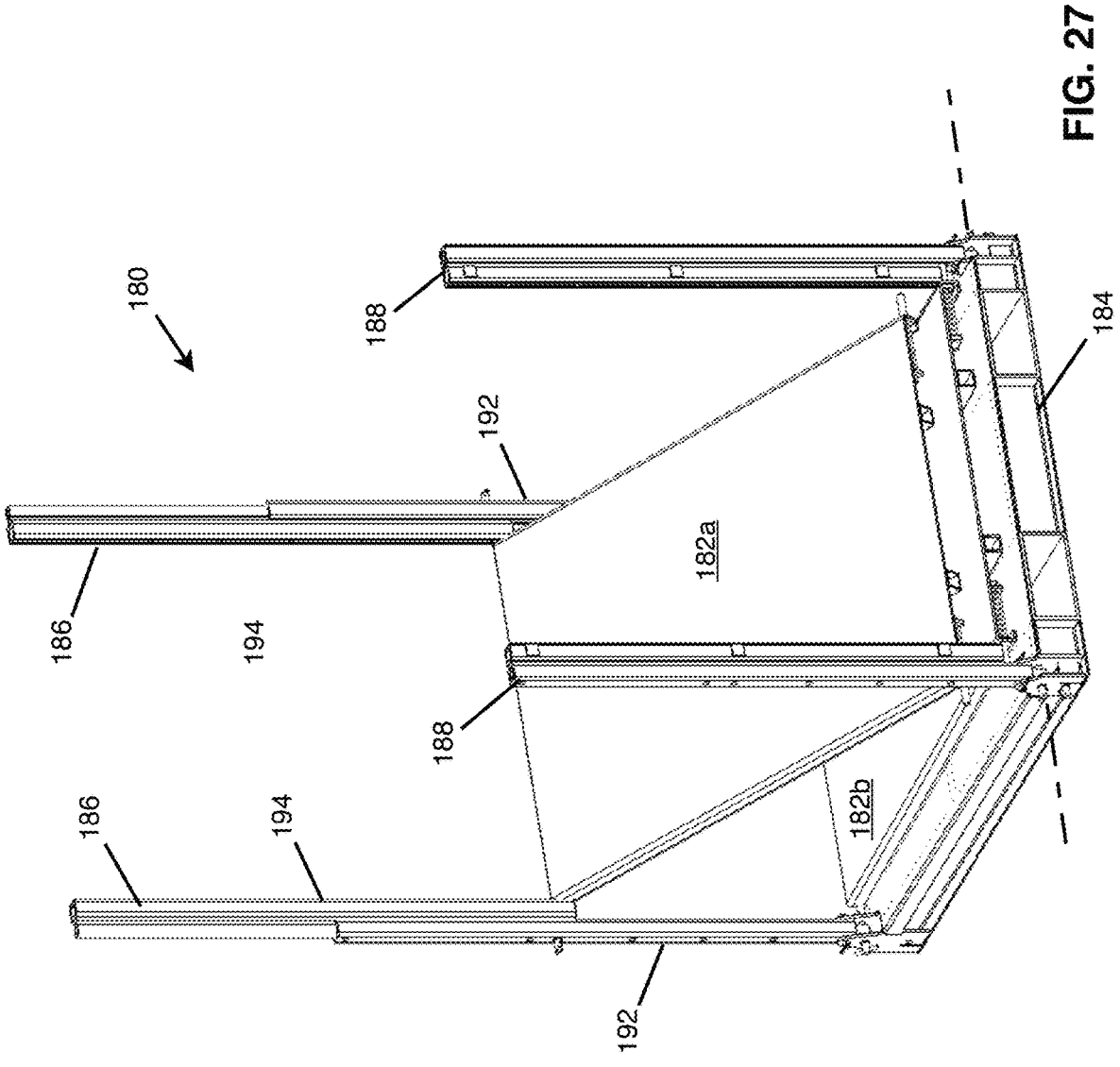
FIG. 27 is a perspective view of the shelving system of FIG. 22 in accordance with an embodiment, with the shelving system depicted in a partially extended position with one shelf partially supported.

FIG. 27 depicts the shelving system 180 in a following position in which the bottom members 202 are rotated from a first horizontal position in FIG. 23 in which they extend parallel to the platform 184 to a second raised position FIG. 24 in which they extend vertical, parallel to the proximate side wall 104 or 106, parallel to the rear telescopic frames 186, proximate to the partition panels 152.

Figure 28:
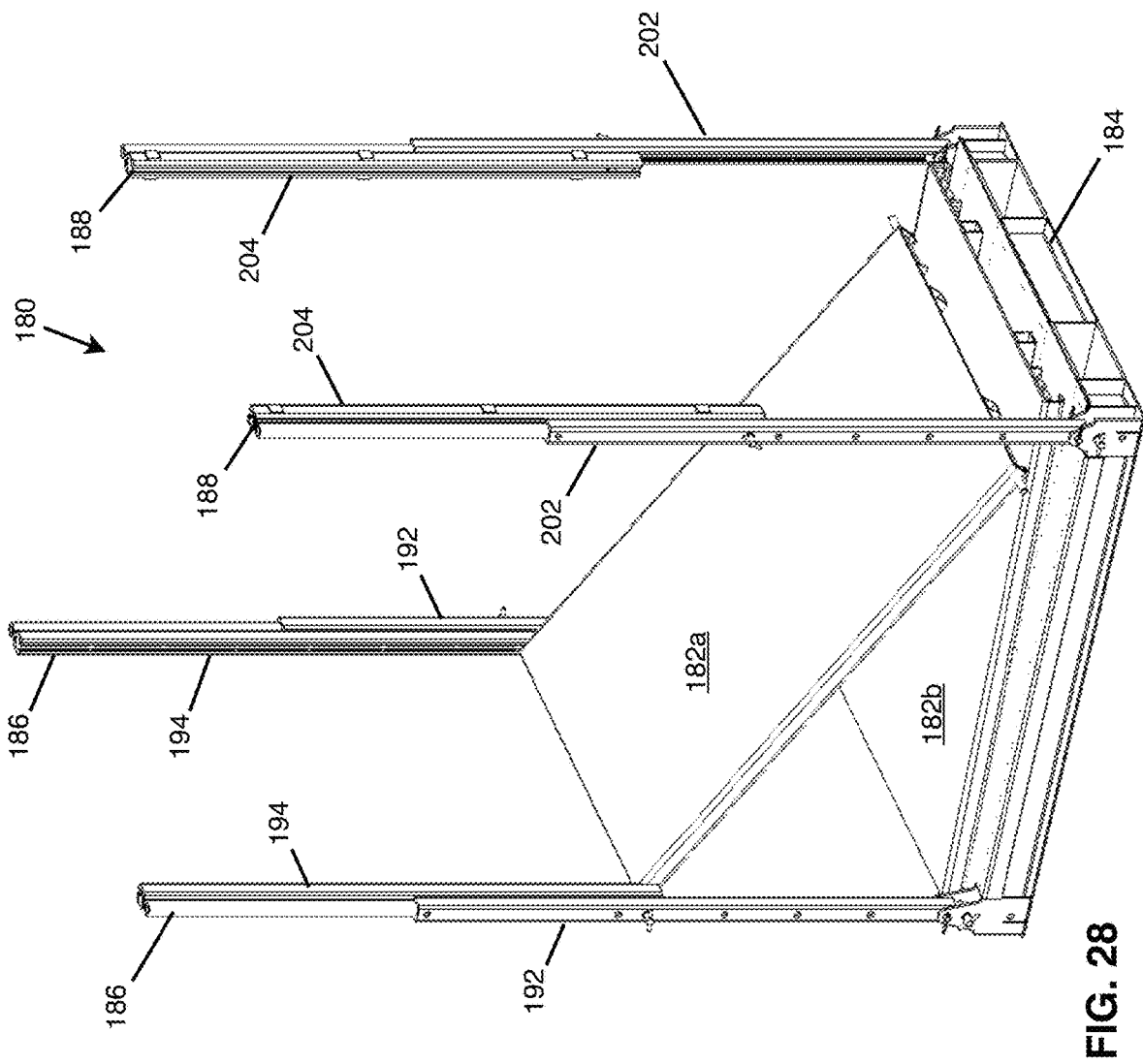
FIG. 28 is a perspective view of the shelving system of FIG. 22 in accordance with an embodiment, with the shelving system depicted in a fully extended position with one shelf partially supported.

FIG. 28 depicts the shelving system 180 in a following position in which the top members 204 are raised relative to their bottom members 202, and locked into a raised position with e.g., a locking pin.

Figure 29:
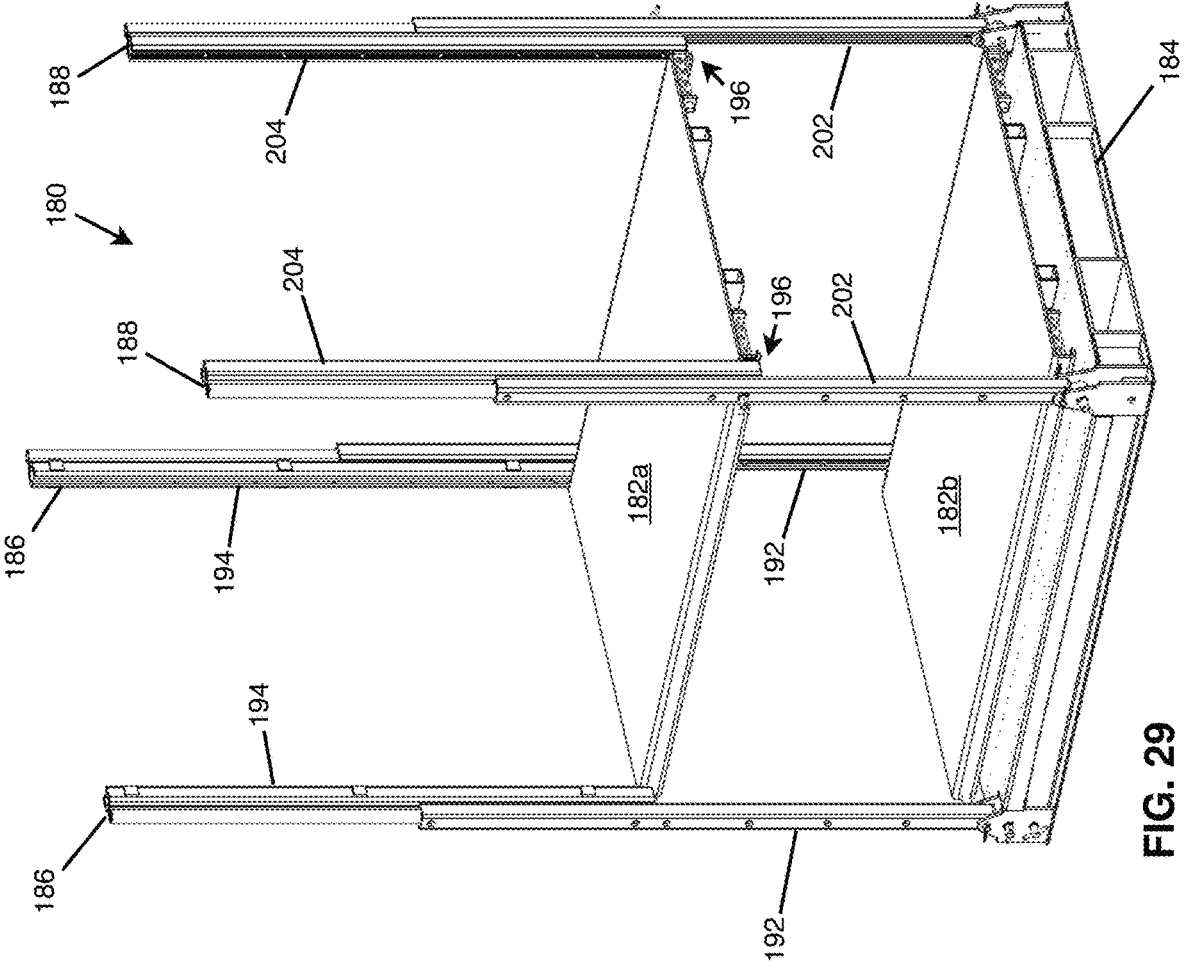
FIG. 29 is a perspective view of the shelving system of FIG. 22 in accordance with an embodiment, with the shelving system depicted in a fully extended position with one shelf fully supported.

FIG. 29 depicts the shelving system 180 in a following position in which the front edge of the shelf 182a is raised such that the shelf 182a becomes parallel to the floor 110 of the interior room 135. The shelve 182a is then locked in place by inserting the front locking pins 196 into the top members 204 of the front telescopic frames 188.

Figure 30:
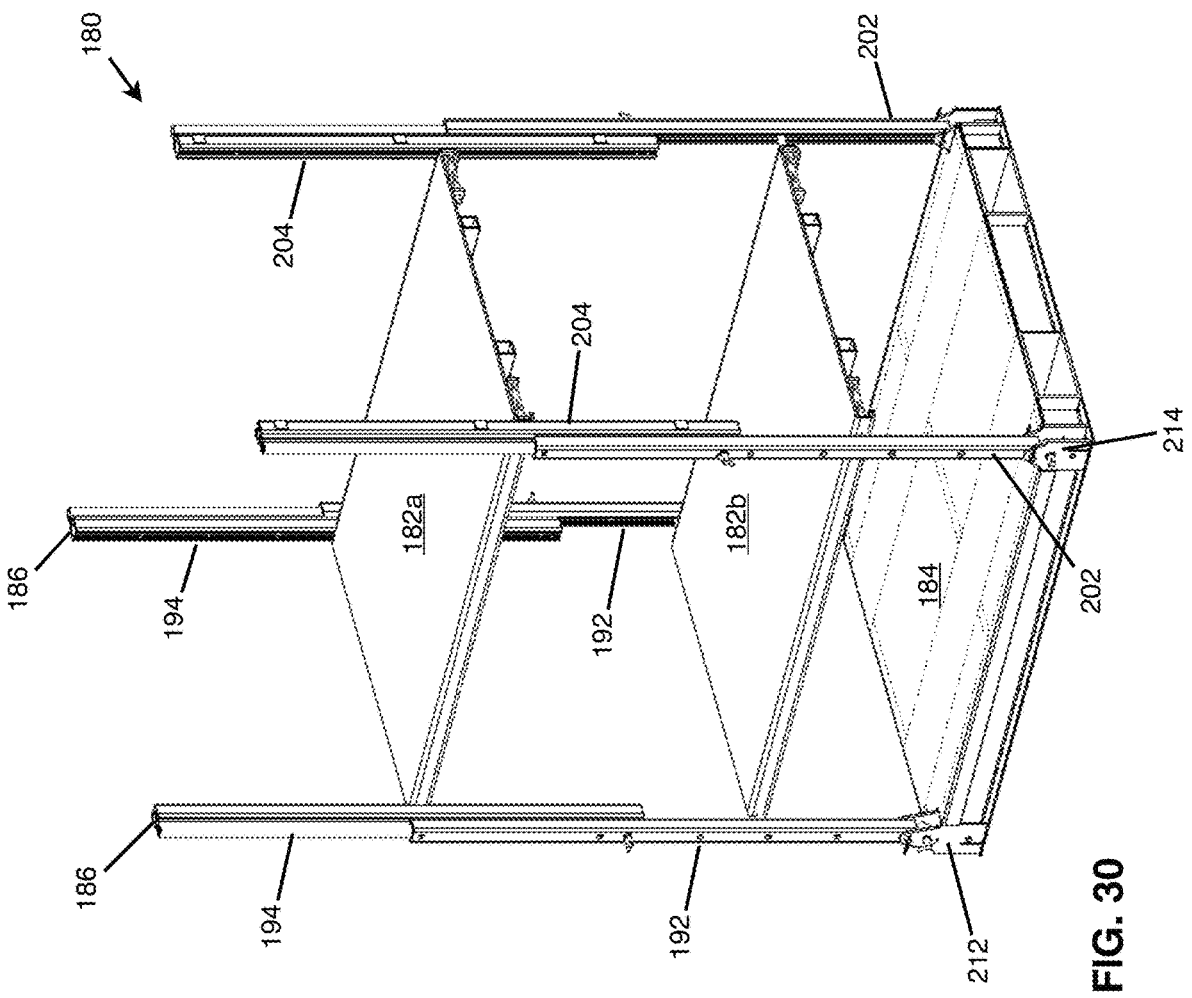
FIG. 30 is a perspective view of the shelving system of FIG. 22 in accordance with an embodiment, with the shelving system depicted in a fully extended position with two shelf fully supported.

FIG. 30 depicts the shelving system 180 in a following position in which the bottom shelf 182b is raised and locked into an intermediary position between the platform 184 and the top shelf 182a. As with the top shelf 182a, the bottom shelf 182b is locked to the rear telescopic frames 186 and front telescopic frames 188 with locking pins 196 extending in the channel 262 (see FIG. 36) of the top members 194, 204.

It is to be noted that the rear telescopic frames 186 and front telescopic frames 188 are designed to be easily foldable. The rear telescopic frames 186 is mounted to the platform 184 using two pins per side. When removing the bottom pin, the rear telescopic frames 186 may rotate around the top pin to extend parallel to the platform 184 on top of the front telescopic frames 188 in a collapsed position.

It is to be noted that the same solution of two pins used to maintain vertical the front telescopic frames 188, with one removed to rotate is used with the front telescopic frames 188.

It is further noted that the platform 184 comprises a first side joist 212 and a second side joist 214 to which are mounted to the rear telescopic frames 186 and the front telescopic frames 188.

It is also to be noted that, according to embodiment, the shelving system 180 may be installed either with one of the rear telescopic frames 186 or front telescopic frames 188 may be installed about the central-side of the cargo container 100, or alternatively at ninety (90) degrees therefrom. Thus, according to embodiments, the shelving system 180 may be inserted through the rear doors 124 or through the side doors 122 of the cargo container 100.

It is further to be noted that the shelving system 180 is adapted to be used in combination with the vertically raising floor system 162. The height of the raising floor system 162 is adjustable such that the platform 184 (with the telescopic frames 186, 188 extending vertically) may provide a generally level floor, with and without shelving systems 180 being mounted in these interior rooms 135.

Figures 31, 32:
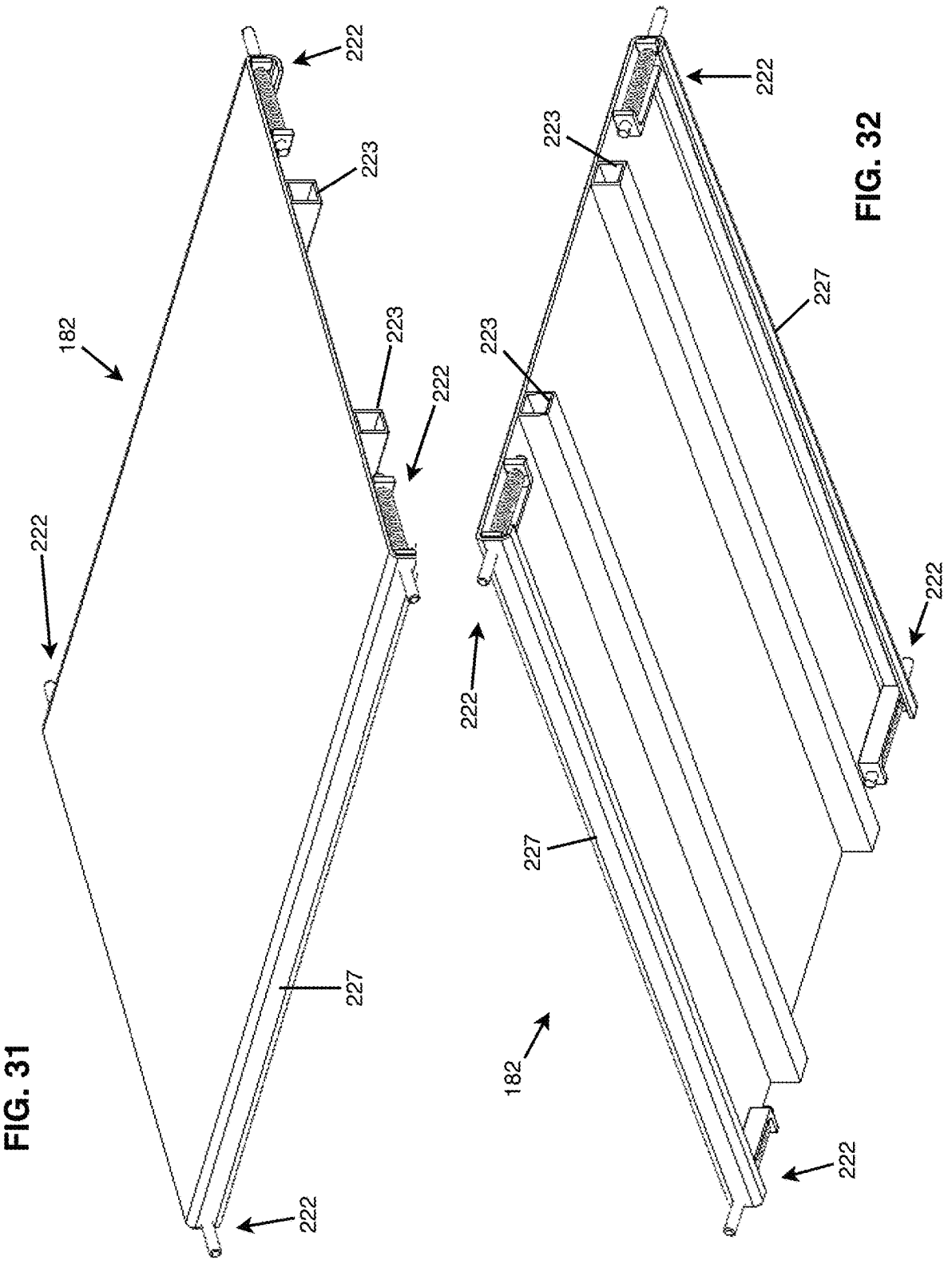
FIG. 31 is a top perspective view of a shelf of the shelving system of FIG. 22 in accordance with an embodiment.
FIG. 32 is a bottom perspective view of a shelf of the shelving system of FIG. 22 in accordance with an embodiment.
Figure 33:
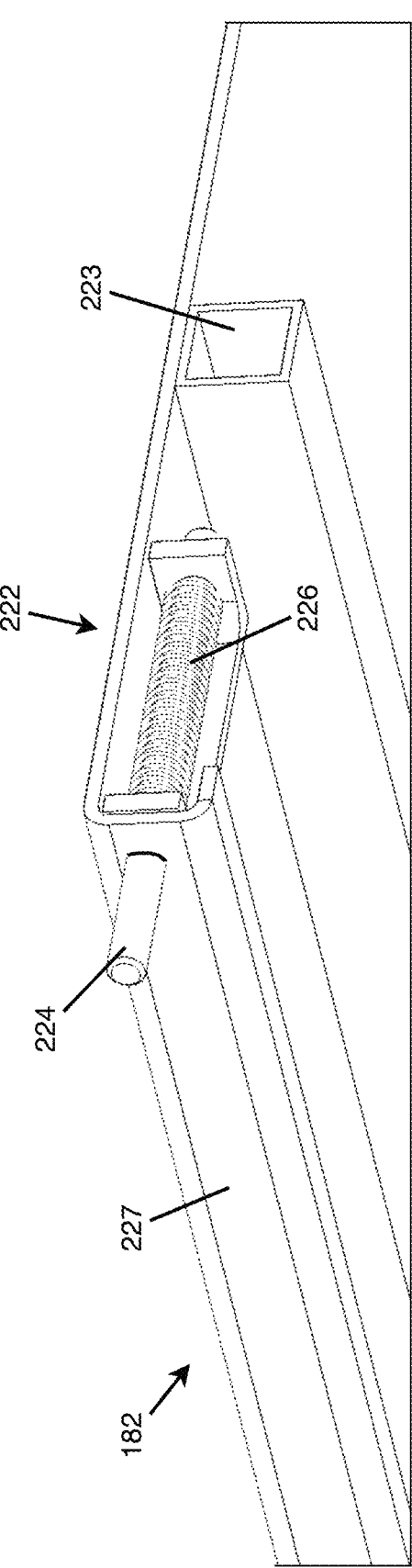
FIG. 33 is a closeup perspective partial bottom view of the shelving system of FIG. 22 depicting a portion of the shelf involved in the shelf being supported in a raised position.
Figure 34:
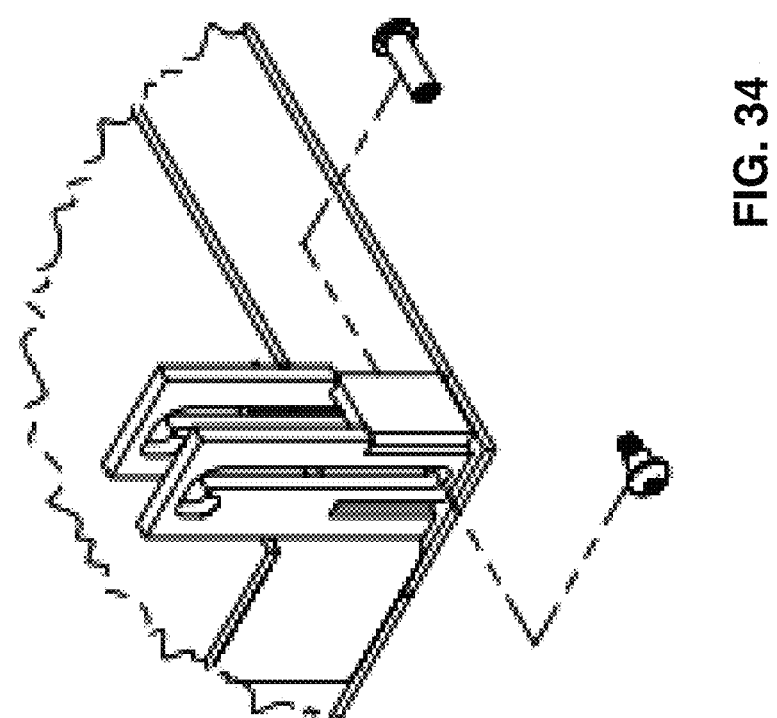
FIG. 34 is a close-up perspective view of a corner of a shelving system in accordance with an embodiment.

FIG. 31, FIG. 32 and FIG. 33 depict a shelf 182 with pin assemblies 222 extending sideways at the four corners of the shelf 182. The pin assemblies 222 comprises a pin 224 and a biasing means, e.g., a spring 226, biasing the pin 224 outwards, ensuring that the pin 224 remains extended, maintaining the shelf 182 in position relative to the telescopic frames 186, 188.

It is worth noting that the shelves 182 features a longitudinal reinforcement beams 223 and seams 227 extending over the whole length of the shelves 182. The reinforcement beams 223 and seams 227 are adapted to support the weight of a e.g., forklift being driven over. According to embodiments, number of reinforcement beams 223 may be more than two, and the thickness of the steel used to manufacture the top plate of the shelf 182, and of the reinforcement beams 223 may be adapted for more or less heavy use.

According to embodiments, other methods may be used for moving the mounting pins 224 of the depicted pin assemblies 222 inwards and outwards. Locking solutions preventing the mounting pins 224 to retract inward out of the rear telescopic frames 186, 188 may added.

Figure 35:
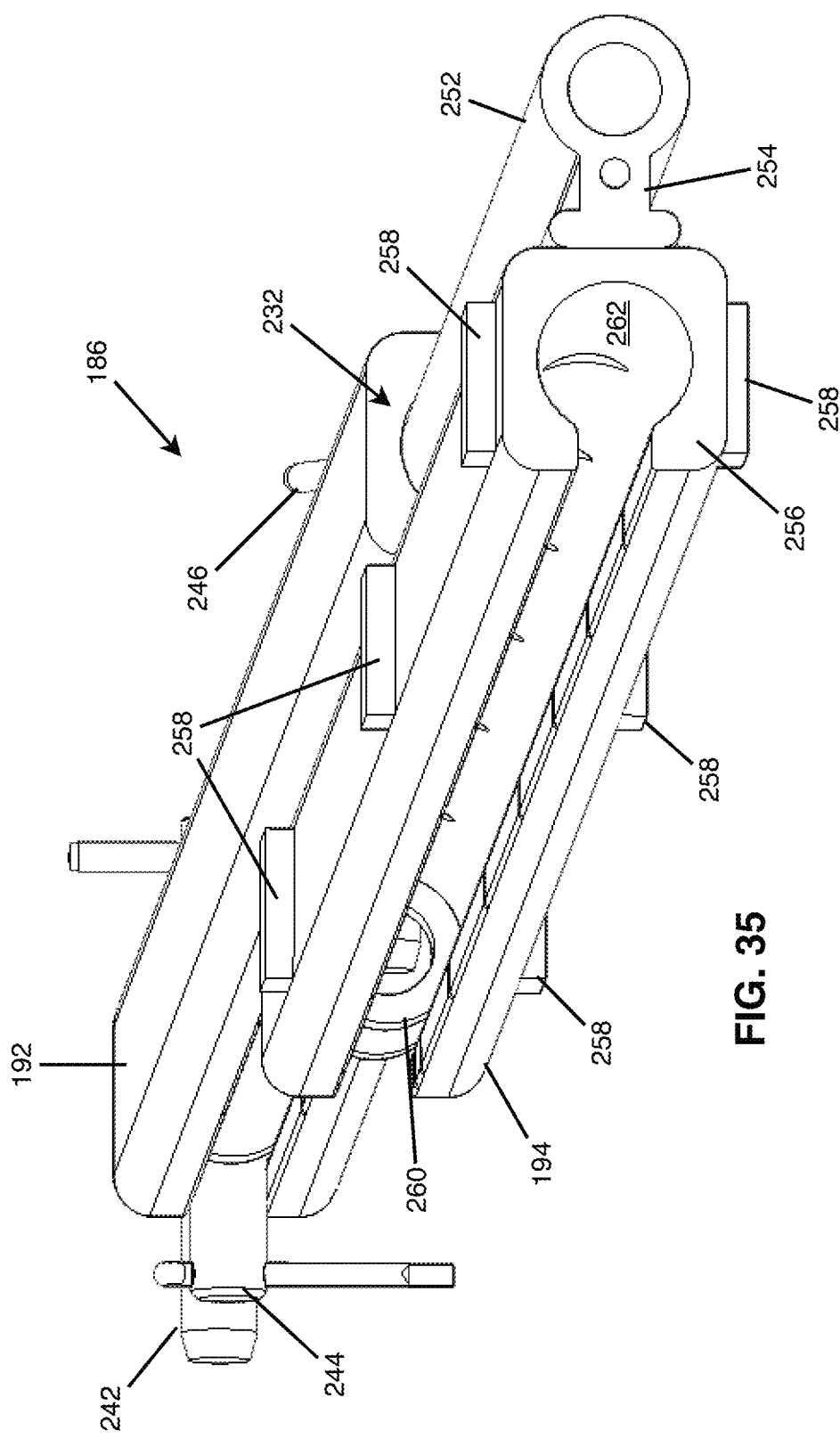
FIG. 35 is a perspective view of a telescopic frame of the shelving system of FIG. 22, with the telescopic frame being depicted in an extended position in accordance with an embodiment.
Figure 36:
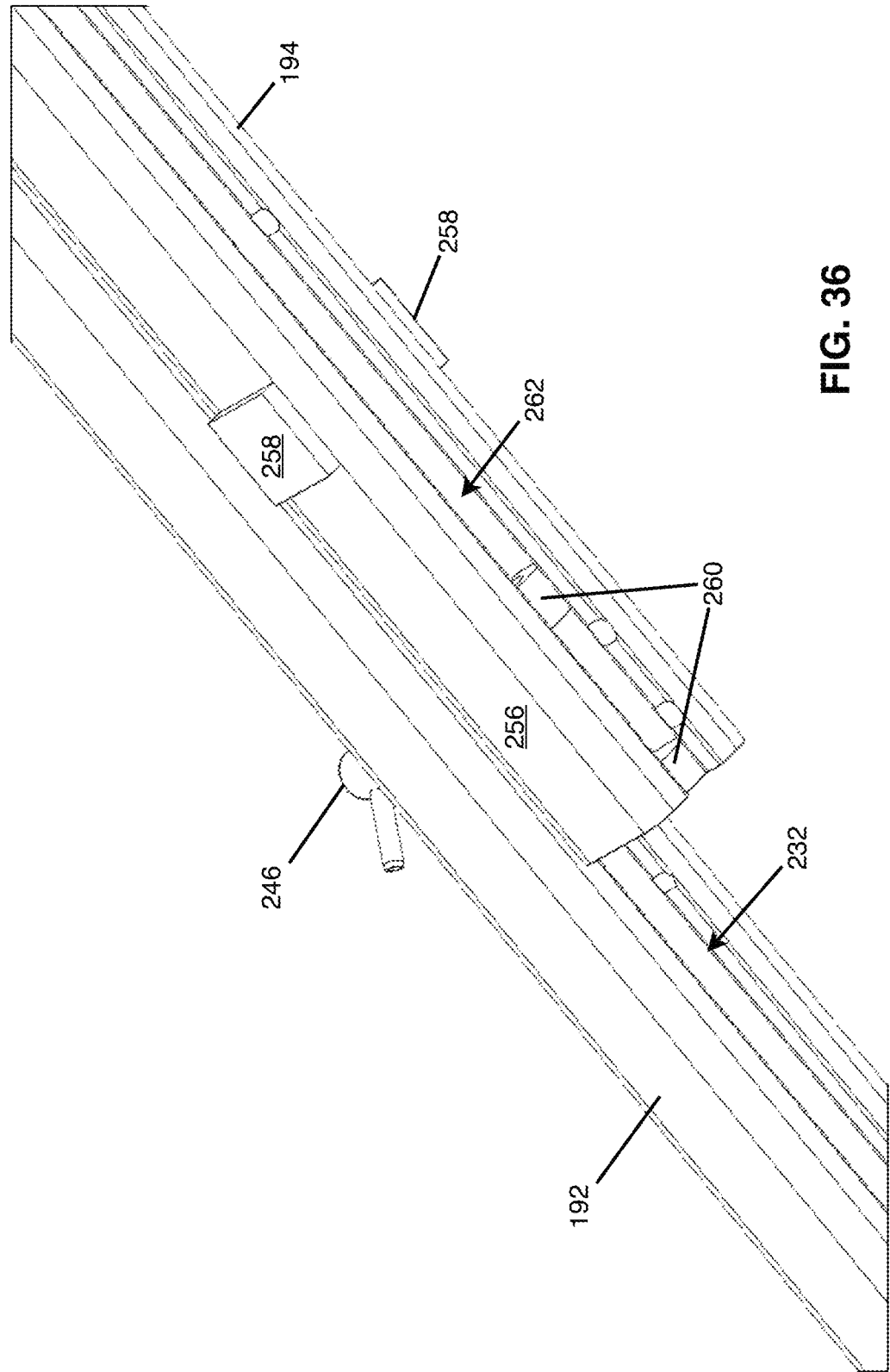
FIG. 36 is a closeup perspective partial view of the telescopic frame depicted in FIG. 35 of the shelving system depicted in FIG. 35.

FIG. 35 and FIG. 36 depict a telescopic frame, e.g., rear telescopic frame 186, in an extended first position. The rear telescopic frame 186 comprises one bottom member 192 and one top member 194 mounted thereto. The bottom member 192 has a longitudinal cylindrical channel 232 extending therethrough. Frame mounting pins 242, 244 are shown, as a telescopic locking pin 246, all coupled to the bottom member 192. The top member 194 comprises a cylindrical portion 252 designed to penetrate in the longitudinal cylindrical channel 232 and be locked at the desired position. The top members 194 further comprises a bridge 254 coupled to the cylindrical portion 252 and designed to extend out of the longitudinal cylindrical channel 232. The bridge 254 is coupled at its outside extremity (outside to the bottom member 192) to a third member 256 comprising abutments 258 on its exterior side surface and locking components 260 involved in locking the top members 194 relative to the bottom member 192.

According to an embodiment, the cargo container 100, the raising floor system 162 and/or the shelving system 180 are partially or only made of aluminum for decreasing the total weight of the cargo container 100, and therefore optimizing maximum cargo weight.

According to an embodiment, a system and method may be associated with the present vehicle, or other vehicle for following the merchandises when loaded in the vehicle, and upon unloading from the vehicle, for registering the information in an enterprise resource planning (ERP) system or other merchandise following system.

An embodiment of the method involves the association of a followable code, e.g. bar code, QR code or magnetic code, to the merchandises, and the association of a followable code to a pallet, crate, or other element, hereinafter called crate, assembling a plurality of merchandises into a single element, and this element loadable into a room of the vehicle. The method further comprises associating a code to the vehicle. The method allows, by following the crate when being loaded, being unloaded through e.g., scanning of the code, and monitoring vehicle location or data regarding the vehicle at the time the crate is unload, to follow the route of the individual merchandise in an ERP system.

According to an embodiment, codes are associated with the rooms. By logging when and/or where the rooms are loaded and emptied, routes of the merchandises may be monitored through an ERP system.

According to an embodiment, sensor(s) are located at the doors, monitoring loading and unloading of merchandise in and out of the vehicle, allowing to keep a real-time inventory of the merchandises in the vehicle all the time.

According to an embodiment, RFIDs are installed on crates, and RFID sensors are mounted to the rooms, adapted to monitor the entry, the location during transport, and the exit of the crates in and out of the rooms. The system may, through such a monitoring system, maintain a log of the use of the rooms and temperature condition of the rooms, and by extension maintain a log of the merchandises stored in the rooms, as the handling and transport condition of the merchandises stored in these rooms during their transport.

According to an embodiment, the vehicle is equipped with sensors, allowing to monitor and log the conditions of the rooms in which merchandises are temporarily stored. Since the rooms in which the merchandises are stored during the transport are known, it is possible to provide a log of storing condition of the merchandises throughout their manutention, at least for example from the warehouse when they are loaded into the vehicle at the moment of to the merchandises are loaded to the location and time the merchandises are unloaded from the vehicle, e.g., delivered to a client.

An Artificial Intelligence (AI) system may be coupled to the vehicle. The AI system is adapted to consider a number of constraints, and determine parameters, such as the room to load merchandises into based on these constraints.

Figure 37:
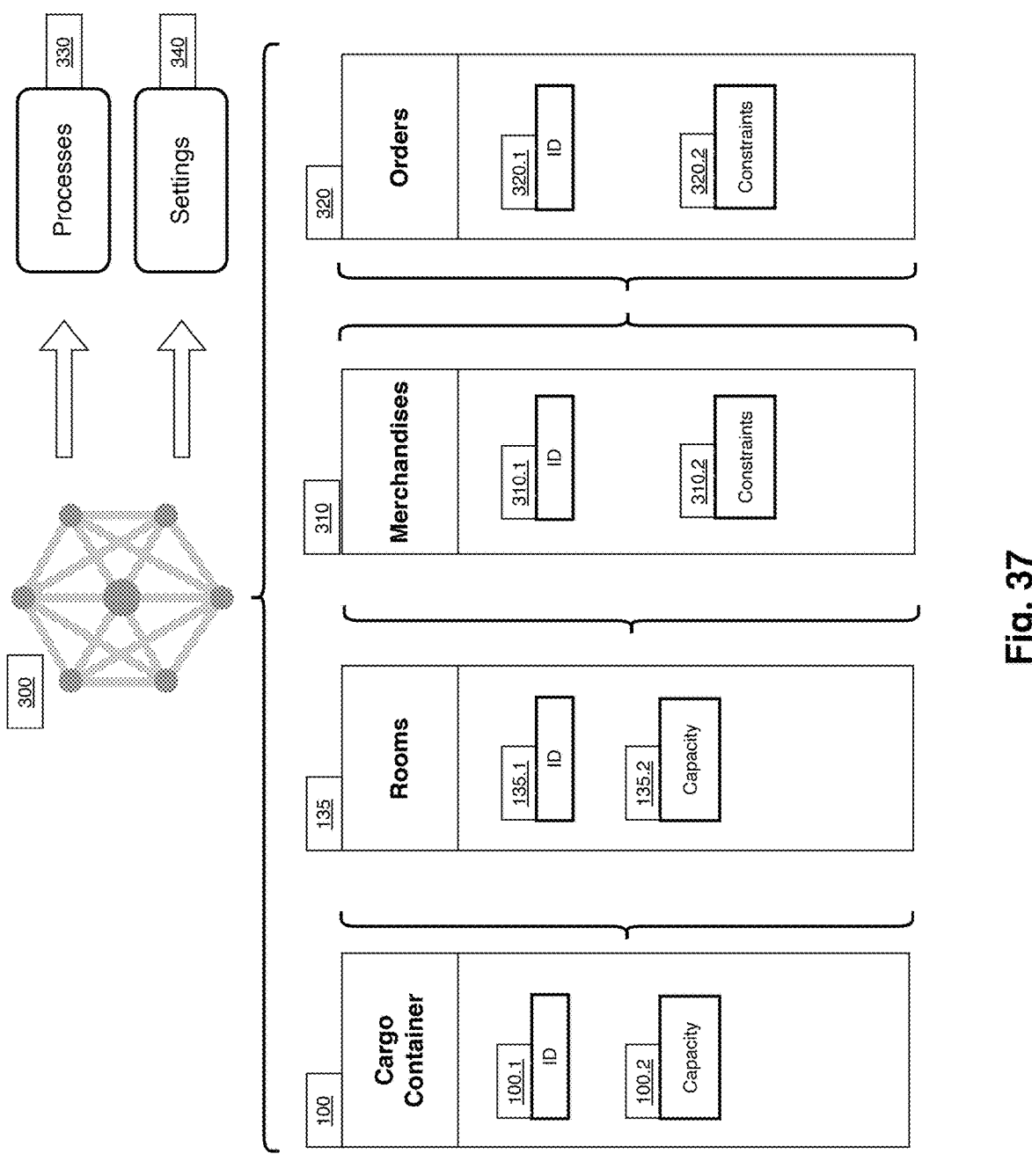
FIG. 37 is a schematic of an Artificial Intelligence (AI) system adapted to optimize at least one of the loading process, the unloading process, and the energy management of the conditioning units of a delivery vehicle comprising a plurality of rooms in accordance with an embodiment.

Referring now to FIG. 37, the graphic schematically depicts the AI system operation architecture.

The AI instance 300 is designed to consider data that include data relative to the vehicle and the merchandises to be transported.

In more details, parameters that are considered by the AI instance 300 include the cargo container 100, which comprises a cargo ID 100.1, and a cargo capacity 100.2 that refers to the physical parameters associated with the cargo container 100, which includes the conditioning capacity, cargo volume, the cargo containers flexibility in being partitioned, travelling range, operating limits of conditioning units, etc.

Additional parameters that are considered by the AI instance 300 include the interior rooms 135 of the cargo container 100, which comprises for each interior room 135 of the cargo container 100 a room ID 135.1, and room capacity 135.2 that refers to the physical parameters individually associated with each of the rooms 135, which includes the maximum storage volume, the capacity to use shelving, operating limits of the conditioning unit (if present), and being shared or not, location of the interior room 135 in the cargo container 100, etc.

Additional parameters that are considered by the AI instance 300 also include orders 320, with an order ID 320.1, and other information generally called constraints that comprises the merchandise(s) 310 to be part of the order 320, package conditions of the merchandise(s) into crates having crate ID, identification and parameters associated with the client such as delivery location, etc.

Additional parameters that are considered by the AI instance 300 also include data regarding the merchandise(s) 310, including merchandise ID 310.1, and merchandise constraints 310.2 that comprise volume of the merchandise(s), weight of the merchandise(s), packaging limitations, storing limitations such as temperature in which to be stored, etc.

The AI instance 300, based on knowledge of these information, is trained to generate processes 330, such as loading processes for automated devices, or human-operated devices to load the cargo container 100 in an appropriate way with the merchandises loaded in rooms such as to balance weight in the vehicle, for balancing requirements for conditioning units, and for maintaining acceptable balance of weight as the vehicle is emptied from merchandises one room at a time on the delivery route. The AI instance is further trained for taking into considerations the where to load orders for optimizing energy consumptions by conditioning units.

The AI instance 300, based on knowledge of these information, is also trained to generate settings 340, such as operating settings for the vehicle, comprising for example the temperature settings for each of the rooms, order of deactivation of the conditioning units along stops on the delivery route, etc.

The present AI instance 300 is designed to continuously perform machine learning as to improve the processes 330 and settings 340 as new conditions arise, as human interactions generate unpredictable situations and modifications, and as new equipment being used. The AI instance 300 is designed to proactively improve loading processes, storing processes, and delivery processes. The AI instance is further trained to monitor processes such as, for example, improve continuous monitoring of merchandises from packaging to the delivery, as monitoring of the storing conditions of the merchandises over the same portion of its life cycle. The AI instance is thus trained to optimize delivery processes and merchandise monitoring processes associated with the delivery process.

It is worth mentioning that when not using such an AI instance, only limit conditions of storage of merchandises of a single order might be considered for setting room temperature. Storing condition are not optimized, frequently either storing the merchandises associated with an order in a single room almost regardless of the storing conditions required for the merchandises, or splitting them into different rooms based solely in volume, increasing the number of side doors to be opened on the delivery route. The AI is trained to prevent naïve considerations that are currently based on human quick evaluation, human that is incapable of considering all parameters that the present AI instance 300 trained for delivery may consider.

Applicant considers that the present AI instance 300, in association with the present cargo container, is adapted to reduce energy consumption associated with maintaining goods at appropriate temperature, decreasing time required to load and unload merchandises, and improve storing conditions of the goods at the time of loading the goods into the cargo container, and on the delivery route.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A cargo container of a hauled or motorized vehicle, the vehicle comprising at least one axle, the vehicle having a driver side and a curb side, the cargo container comprising:
   a front wall and a rear wall with a longitudinal axis extending towards one another, two side walls with a transversal axis extending towards one another, the front wall, the rear wall and the side walls enclosing a cargo volume, wherein the cargo container is adapted to store a plurality of cargos therein;
   at least one partition panel spanning transversally, the at least one partition panel being moveable between an opened position and a closed position, the partition panel, when in the closed position, partitioning cargo volume into a plurality of rooms; and
   a plurality of exterior doors accessible from outside the cargo container, comprising at least one rear door providing an access to all of the rooms of the cargo volume when the at least one partition panel is in the opened position, and a plurality of side doors located on a side in the respective side wall, the plurality of side doors providing an access to the rooms when the partition panel is in the opened position and when the partition panel is in the closed position.

2. The cargo container of claim 1, wherein each of the at least one partition panel comprises a fixed partition frame and a partition door rotatably mounted to the partition frame.

3. The cargo container of claim 2, further comprising a seal sealing rooms from one another when the partition door is in the closed position.

4. The cargo container of claim 2, wherein the partition door extends from the partition frame towards the rear wall when in the opening position.

5. The cargo container of claim 1, further comprising a longitudinal wall extending parallel to the longitudinal axis, the longitudinal wall dividing the cargo volume into a driver side volume and a curb side volume, and wherein the at least one partition panel span between a side wall and the longitudinal wall.

6. The cargo container of claim 5, wherein the partition door is extending aside the longitudinal wall when in the opened position.

7. The cargo container of claim 5, wherein the at least one partition panel comprises at least one driver side partition panel and at least one curb side partition panel, the cargo container comprising a conditioning unit coupled operatively to a first one of the rooms on the driver side of the longitudinal wall and a second one of the rooms on the curb side of the longitudinal wall.

8. The cargo container of claim 1, further comprising a conditioning unit coupled operatively to a first one of the rooms, whereby the conditioning unit is conditioning one of the at least one room independently one another.

9. The cargo container of claim 8, further comprising a roof, wherein the conditioning unit is mounted to the roof.

10. The cargo container of claim 1, further comprising a wheelhouse and a floor divided in a plurality of floor portions, wherein a first one of the floor portions located above the wheelhouse has a first height, and a second one of the floor portions located distant to the wheelhouse has a second height different from the first height, whereby the floor comprising the plurality of floor portion unleveled relative to one another.

11. The cargo container of claim 10, wherein the rear door extends from the first height upwards, and at least one of the side doors extends upwards from a third height lower than the first height.

12. The cargo container of claim 10, further comprising a first raising floor system comprising a top surface that is controllably movable between a low position and a high position levelled with the first floor portion.

13. The cargo container of claim 12, comprising a second raising floor system, wherein the first raising floor system and the second raising floor system are located on opposite sides of the longitudinal wall.

14. The cargo container of claim 12, wherein the first raising floor system comprises a scissor-based mechanism movable between a collapsed position and an extended position.

15. The cargo container of claim 12, comprising a second raising floor system, wherein the first raising floor system and the second raising floor system are controllable independently from one another, wherein the first raising floor system and the second raising floor system are neighbor longitudinally to one another, wherein length of a continuous leveled floor is controllable by independently controlling position of the first raising floor system and of the second raising floor system.

16. The cargo container of claim 12, further comprising an external floor extending rearwards to the rear wall, with the external floor and the first floor portion being leveled relative to one another.

17. The cargo container of claim 10, wherein, on the second floor portion the at least one partition panel comprises a fixed partition frame extending upwards from the second floor portion, and a partition door rotatably mounted to the partition frame, the partition door extending upwards from the first height.

18. The cargo container of claim 1, comprising chassis comprising a longitudinal central beam assembly, and a body comprising a groove, wherein the body in mounted to the chassis with the longitudinal central beam assembly inserted in the groove.

19. The cargo container of claim 18, wherein the chassis comprises a transversal beams extending from the central beam assembly, wherein the side walls are at least partially supported by the transversal beams.

20. The cargo container of claim 18, wherein the chassis comprises a front section, a wheelhouse section and a rear section, with height of bottom of the chassis is varying along the sections.

\* \* \* \* \*